(12) United States Patent
Henshaw

(10) Patent No.: US 9,545,999 B2
(45) Date of Patent: Jan. 17, 2017

(54) SEATING ARRANGEMENT

(71) Applicant: Robert J. Henshaw, Newnan, GA (US)

(72) Inventor: Robert J. Henshaw, Newnan, GA (US)

( * ) Notice: Subject to any disclaimer, the term of this patent is extended or adjusted under 35 U.S.C. 154(b) by 128 days.

(21) Appl. No.: 14/566,644

(22) Filed: Dec. 10, 2014

(65) Prior Publication Data

US 2015/0166183 A1 Jun. 18, 2015

Related U.S. Application Data

(60) Provisional application No. 61/915,872, filed on Dec. 13, 2013.

(51) Int. Cl.
*B64D 11/06* (2006.01)

(52) U.S. Cl.
CPC ......... *B64D 11/0601* (2014.12); *B64D 11/064* (2014.12); *B64D 11/0606* (2014.12); *B64D 11/0641* (2014.12); *B64D 11/0646* (2014.12)

(58) Field of Classification Search
CPC .................................................... B64D 11/06
USPC .................................................... 244/118.5
See application file for complete search history.

(56) References Cited

U.S. PATENT DOCUMENTS

| | | | | |
|---|---|---|---|---|
| 2,163,198 A | * | 6/1939 | Gossard | B61D 33/005 297/245 |
| 7,845,718 B1 | * | 12/2010 | Bosstick | B60N 2/345 297/118 |
| 8,662,447 B2 | * | 3/2014 | Johnson | B64D 11/0604 244/118.5 |
| 8,882,036 B2 | * | 11/2014 | Henshaw | B64D 11/06 244/118.6 |
| 8,936,214 B2 | * | 1/2015 | Foucher | B64D 11/06 244/118.6 |

* cited by examiner

*Primary Examiner* — Brian M O'Hara
*Assistant Examiner* — Keith L Dixon
(74) *Attorney, Agent, or Firm* — Maristyn Law LLC; Lynda F. Kouroupis

(57) ABSTRACT

Seating arrangements are provided that combine standard fore- and aft-facing lie-flat seating assemblies with a center premium lie-flat seating assembly. A center suite can include a center support shell and at least one center seat. The center support shell can provide a plurality of legwells for association with a plurality of standard seats. A center seat can be disposed between legwells in a non-overlapping manner so that legwells straddle the center seat. Surface area can be provided over the legwells to provide generous living space for a seated passenger, and to cooperate with a center seat to provide a bed for a reclined passenger. The support shell can have parallel endwalls orthogonal to parallel sidewalls to provide a center bed that is generally uniform in length and width. Legwells can be disposed in parallel and mirrored configurations.

29 Claims, 30 Drawing Sheets

SEATING ARRANGEMENT

CROSS-REFERENCE TO RELATED APPLICATIONS

This application claims priority from U.S. Provisional Application No. 61/915,872, titled "Seating Arrangement", filed on Dec. 13, 2013 by Henshaw, which is incorporated herein in its entirety by reference.

FIELD OF INVENTION

The present invention relates to seating and seating arrangements for passenger vehicles, and more particularly, to aircraft seating arrangements having premium seating in which seats can be converted between an upright position and a lie-flat sleeping position.

BACKGROUND OF INVENTION

Optimizing an aircraft seating arrangement can include both maximizing seating as well as providing passenger comfort and convenience features. A tension between the two naturally exists, since increasing seating density can often result in provision of narrower seats and shorter leg space that can restrict movement and make a passenger feel cramped. Generally, the more spacious and comfortable a seat, the more an airline can charge for the seat, but the fewer the number of seats that can be provided.

A traditional aircraft seat can include a seat base on which a passenger sits and a seatback against which a passenger leans back. The seatback is typically adjustable to move between a generally upright "takeoff and landing position" and a slightly reclined "traveling" position. Aircraft seats are typically arranged side-by-side in rows transverse to the longitudinal axis of the aircraft with the seats facing forward in the direction of travel. The seat rows are typically spaced apart from one another so that in commercial aircraft, seats are usually arranged having a pitch between 27 and 82 inches to provide legroom between the rows. Longitudinal aisles may be provided that divide the seats into sections. For example, the seating arrangement may include two aisles that divide the seating arrangement into a center section and two side sections to provide improved ingress and egress to the rows and access to emergency exits.

To maximize profit, airlines charge higher fares for upgraded or premium seating. For example, a premium seat may be wider, and recline farther, and be arranged to provide more legroom than a standard seat. Some aircraft are divided into different class cabins, with each having a different seating arrangement. For example, an aircraft may have a higher fare "first class" cabin near the front of the plane and a lower fare "coach" class cabin at the rear of the plane. More recently, airlines have introduced "business class" seating, which can provide more comfort than coach class but remain less expensive than first class seating.

Seats that are convertible between a "takeoff and landing" generally upright position to a "lie-flat" sleeping position have been introduced to allow the seats to be used as "beds." These seats have proven popular on long haul and international flights during which a passenger may desire to sleep aboard the aircraft. While lie-flat seating can provide additional comfort to passengers, and higher revenue to airlines, lie-flat seating occupies additional space, limiting the number of seats that a fuselage can accommodate. For example, when seats are oriented at an angle relative to a vehicle floor, a lie-flat seating arrangement typically has a seat pitch of about 58 to 63 inches, significantly greater than the pitch of coach class seating which generally ranges from 27 to 34 inches. Angled lie-flat seating can place one passenger's head over the feet of the passenger directly behind him or her. Non-angled lie-flat seating typically has a pitch of 76 to 82 inches, and may rely on an alternative arrangement of seats to facilitate efficient utilization of space in the aircraft.

Some attempts to optimize a lie-flat seating arrangement have included angling the seats in a horizontal plane in a "chevron" style in an attempt to increase seating density while providing lie-flat seating. Other attempts have included overlapping portions of the seats vertically, placing a passenger's feet underneath the head of another passenger seated in front of him. For example, an arrangement can include seats that recline at an angle so that the feet of a passenger in a rearward seat extend below the head of a reclined passenger reclined in front. Other arrangements include seats that are placed back-to-back lengthwise, with alternate seats placed substantially above the passageway floor with the remaining seats below the passageway floor, so that the back of the upper seat reclines over the back of the adjacent lower seat.

More recently, a seating arrangement has been proposed that includes a raised seat that overlaps two lower seats when reclined a lie-flat position. By exploiting generally unused vertical space seating density can be increased to maximize passenger capacity while providing fully reclining seating.

While fit for their intended purposes, most prior art arrangements are plagued by several drawbacks and disadvantages. For example, some prior art seating arrangements configure the seat of a first passenger to cover the head of a second passenger, providing a generally undesirable configuration. However, attempts to avoid covering the head of a passenger often result in configurations with pitch distances that fail to achieve desired passenger density levels. In addition, higher density arrangements, even those in which a passenger's head is not covered, may fail to provide the desired degree of privacy to passengers, particularly when the seats are configured in a lie-flat position for a passenger to sleep. While exploiting vertical space may increase the amount of "personal space" in some arrangements, configurations with raised seating can impose additional loads during aircraft take-off, making it more difficult and costly to satisfy federal aviation regulations.

SUMMARY OF INVENTION

In an exemplary embodiment, aircraft seating is arranged to include a fore-facing standard seating assembly, an aft-facing standard seating assembly, and a center seating assembly positioned between the fore-facing and aft-facing seating assemblies. The center assembly can be in the form of a compartment that comprises a center shell structure and a center seat configured to be convertible from an upright to a lie-flat mode. When configured in an upright take-off position, the center seat has a seat pan disposed at a first height relative to a cabin floor; however, when moved to a lie-flat position, the seat can be configured to cooperate with the center shell structure to provide a bed disposed at an increased height above the cabin floor. By way of example, the center compartment comprises a seat configured to vertically translate from a lower take-off position to a higher position when converted from an upright to a lie-flat mode. In a further embodiment, the center compartment can be configured with a seat having a seat back configured to fold down over the seat pan so that a rear surface of the seat back cooperates with the compartment shell to provide a raised center bed.

At a first sidewall, the center compartment structure can provide a first legwell for association with the fore-facing standard assembly and a second legwell for association with the aft-facing seating assembly. The two legwells can have generally the same shape and size and can be aligned with each other in an opposing mirrored configuration. The center seat can be disposed adjacent the first legwell in a non-overlapping configuration. Aprons bordering the center seat provide surface area over the legwells that can be used with the center seat to provide a center bed having a generally uniform width and length that is wider than the center seat.

When a standard fore- or aft-facing seat is in an upright take-off position, its seat pan is disposed at generally the same height as that of the center compartment seat in an upright position. In an exemplary embodiment, at least one of the fore-facing and aft-facing assemblies of the three-seat grouping includes a seat convertible between the upright position and a lie-flat position to cooperate with its associated legwell to form a bed for a standard seating passenger. By way of example, a standard seat can have a seat back configured to controllably recline while a seat pan moves forward to a lower elevation to move the seating assembly from an upright to a lie-flat position. In an example 3-seat arrangement, beds provided by the fore-facing and aft-facing assemblies are disposed in an opposing mirrored arrangement parallel to the bed provided at the center compartment.

An example seating arrangement includes a five-seat grouping that includes a fore-facing seating assembly, an aft-facing seating assembly, and a center seating assembly disposed between said fore-facing seating and aft-facing seating assemblies. In an example arrangement, the center seating assembly is embodied as a premium suite that provides expanded personal space for an individual passenger. In an example arrangement, all three assemblies can offer lie-flat seating, with the fore- and aft-facing seating assemblies offering standard seats, and the center suite providing an upgraded seat.

The fore-facing seating assembly can comprise a shell, a first fore-facing seat and a second fore-facing seat; and the aft-facing seating assembly can comprise a shell, a first aft-facing seat and a second aft-facing seat. The center suite can include a center suite shell structure and a center seat, with the suite shell structure sufficiently large to provide separate, individual leg and foot space for all standard seating assembly passengers. Legwells for receiving the legs and feet of passengers in fore-facing standard seating can be disposed in a mirrored arrangement that straddles the center seat and directs the feet of standard seat passengers to opposing sidewalls of the suite shell structure. The legwells can thereby define a space between them at which the center seat can be disposed. The suite shell structure can further provide a third legwell for receiving the feet of a passenger of the first aft-facing seat, and a fourth legwell for receiving the feet of a passenger of the second aft-facing seat. Like those for the fore-facing passengers, the third and fourth legwells can be disposed in a mirrored arrangement that directs the feet of aft-passengers to opposing sides of the center suite. First and second aprons can be provided over the legwells to "frame" a center seating area at the center compartment in which the center seat is disposed, and provide additional surface area that can provide generous living space and a wide premium bed.

In an upright take-off position, the center seat can be disposed at generally the same height above a cabin floor as seats of the standard fore- and aft-facing assemblies. However, when moved to a lie-flat position, the center seat can cooperate with the aprons of the suite shell structure to provide a raised bed at an increased height above the cabin floor. In an example embodiment, the center seat can be configured for upward vertical translation when moved from an upright to a lie-flat position. In a further embodiment, the center seating assembly can be configured with a seat having a seat back configured to fold down over a seat pan so that its rear surface is disposed at the same level as the aprons over the legwells to provide a generally horizontal, contiguous surface.

By way of example, the fore-facing, aft-facing and center seats can be arranged in a parallel configuration in which their respective shell structures are parallel with each other, standard and center seats are parallel, and beds provided by the assemblies are parallel with each other.

An example embodiment can include an 8-seat group that provides double-occupancy premium seating and triple-occupancy standard seating. An arrangement can include a fore-facing seating assembly having three standard fore-facing seats, an aft-facing seating assembly having three standard aft-facing seats, and a center seating assembly embodied as a suite comprising two center compartments. The center suite can include a suite shell structure providing first and second compartments each having a center sitting area for a center seat. The suite shell structure can provide a first outer legwell for receiving the feet of an occupant of the first fore-facing seat, a middle legwell for receiving the feet of an occupant of said second fore-facing seat, and a second outer legwell for receiving the feet of an occupant of the third fore-facing seat. The three legwells can help define the two sitting areas of the center suite. The first center seat can be disposed between the first outer legwell and the middle legwell, and the second center seat can be disposed between the middle legwell and the second outer legwell so that the three legwells straddle the two center seats. Middle legwells extend between the two seating areas and can be larger than the outer legwells disposed at suite shell sidewalls. Legwells can be provided in a mirrored arrangement that efficiently provides comfortable space for standard seating passengers and enhanced space for suite passengers. Aprons disposed over the legwells around a center seat provide surface area that can combine with a center seat to provide a premium bed.

In an upright position, seat pans of the center seats are disposed at a first height above a cabin floor that is generally the same as that of seat pans of the standard seating. However, when moved to a lie-flat position, the center seats can cooperate with the aprons provided by the compartment shell to provide a raised bed, of generally uniform length and width, disposed at a greater height above the cabin floor. In an example embodiment, all 8 seats are convertible between upright and lie-flat positions. Footrests disposed at the legwells provided by the center suite structure can cooperate with the fore-facing and aft-facing seats to provide beds for the standard seating occupants.

The 3-seat, 5-seat, and 8-seat example arrangements provide premium seating options that efficiently and comfortably provide high density seating. It is contemplated that the seating can be used as first class or business class seating that can generate additional income for aircraft carriers. Disposition of legwells to the side of a center seat allow space above the legwells to be used as bed surface area, work surface area, or as area at which auxiliary features can be provided. A plurality of 3-, 5-, and/or 8-seat groups can be disposed across an aircraft fuselage to provide high-density premium seating that attends to passenger comfort.

DETAILED DESCRIPTION OF EXAMPLE EMBODIMENTS

Figure 1:
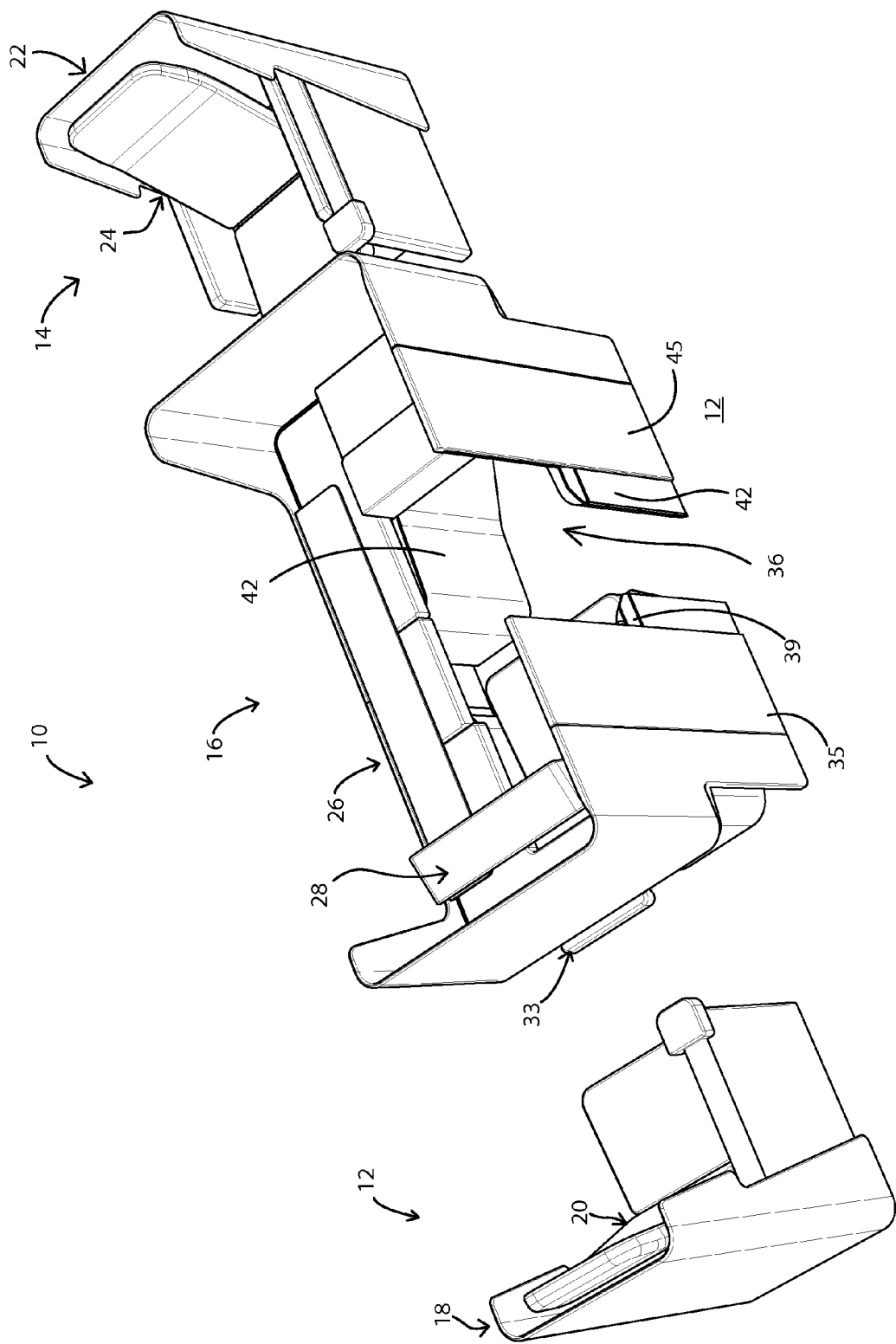
FIG. 1 depicts an example 3-seat grouping seating arrangement.

As required, exemplary embodiments of the present invention are disclosed herein. These embodiments are meant to be examples of various ways of implementing the invention and it will be understood that the invention may be embodied in alternative forms. The figures may not be to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. The terms "fore" and "aft" are used merely for orientational purposes in reference to the particular exemplary embodiments shown in the drawings. Furthermore, the term lie-flat may mean substantially flat which could be angled and not necessarily horizontal. The term "standard" may be used throughout the description simply to differentiate seats of fore- and aft-facing assemblies from premium seating that can be provided at a center seating assembly, no relation to prior art is implied.

For purposes of teaching, and not limitation, the exemplary embodiments disclosed herein are discussed in the context of a Boeing 777, an Airbus A380 or an Airbus A350 aircraft. However, the present invention is applicable to other aircraft and passenger vehicles. Furthermore, seats and seating arrangements described herein are not limited to aircraft, but may be adapted for use in other vehicles as well.

Referring to the Drawings, wherein like numerals represent like elements throughout the several views, FIGS. 1-9 depict an example seating arrangement 10. The seating arrangement 10 includes a fore-facing seating assembly 12, an aft-facing seating assembly 14, and a center seating assembly embodied as compartment 16, positioned between the fore-facing and aft-facing seating assemblies 12 and 14. The fore- and aft-facing assemblies 12 and 14 can be considered "standard" seating in comparison with the compartment 16 which can offer premium seating. The fore-facing seating assembly 12 comprises a fore-facing support shell 18 and a seat 20; the aft-facing seating assembly 14 comprises an aft-facing support shell 22 and a seat 24.

The center compartment 16 comprises a center compartment shell 26 and a center seat 28 that is convertible from an upright to a lie-flat position. The center compartment 16 provides an occupant with additional leg and work space as well as additional privacy as the compartment shell 26 provides separation and concealment between an occupant of the center seat 28 and occupants of the fore- and aft-facing seating assemblies 12 and 14. In an example embodiment, the center seat 28 can be larger than the seats 20, 24. For example, the center seat 28 can have a width around 24 inches, while the standard seats 20, 24 can have a width around 19 inches. The seatpans of the standard assembly seats 20, 24 and of the compartment 16 center seat 28 can be disposed at generally the same initial height H1 (see FIG. 5) above a vehicle cabin floor 29 when set in an upright position. However as discussed in further detail below, the central compartment 16 can provide a wide raised bed at a second higher height when a center seat is moved to a lie-flat position.

In an example embodiment, the compartment shell 26 provides a first legwell 30 for association with the fore-facing seating assembly 12, and a second legwell 32 for the aft-facing seating assembly 14. A footrest 31 can be disposed at the legwell 30, and a footrest 33 can be disposed at the legwell 32 to support the legs of a reclined standard seat passenger. The legwells 30, 32 can be configured to "mirror" each other in a symmetrically opposed arrangement. Accordingly, the footrests 31,33, which conform to the shape of the legwells 30,32 can have similar shapes that mirror each other. The opposing legwells 30 and 32 can both be disposed at a sidewall 34 of the compartment shell 26, providing a large unencumbered leg space 36 for the legs of a center seat 20 occupant.

Figure 2:
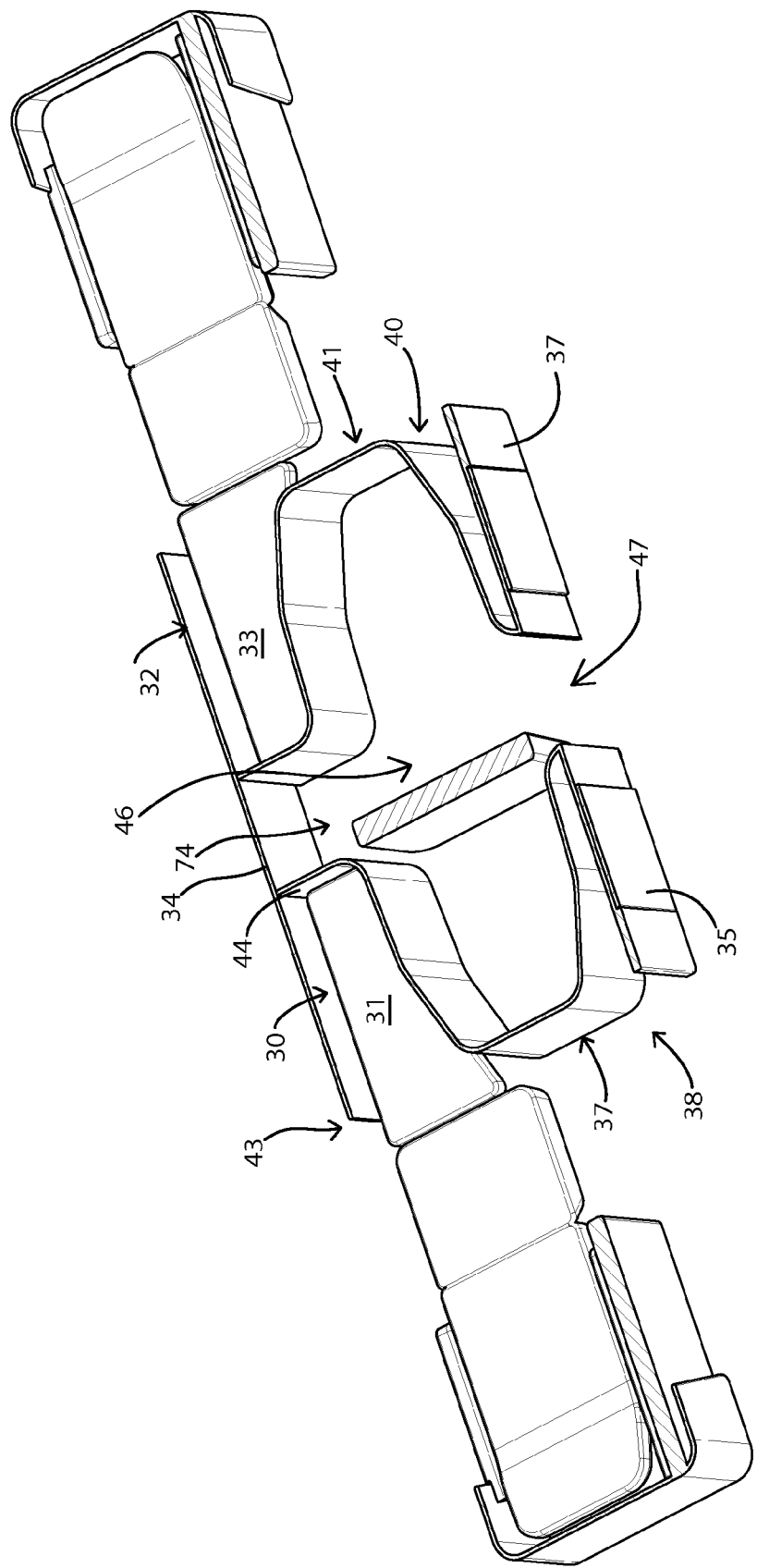
FIG. 2 depicts an example 3-seat grouping seating arrangement.
Figure 3:
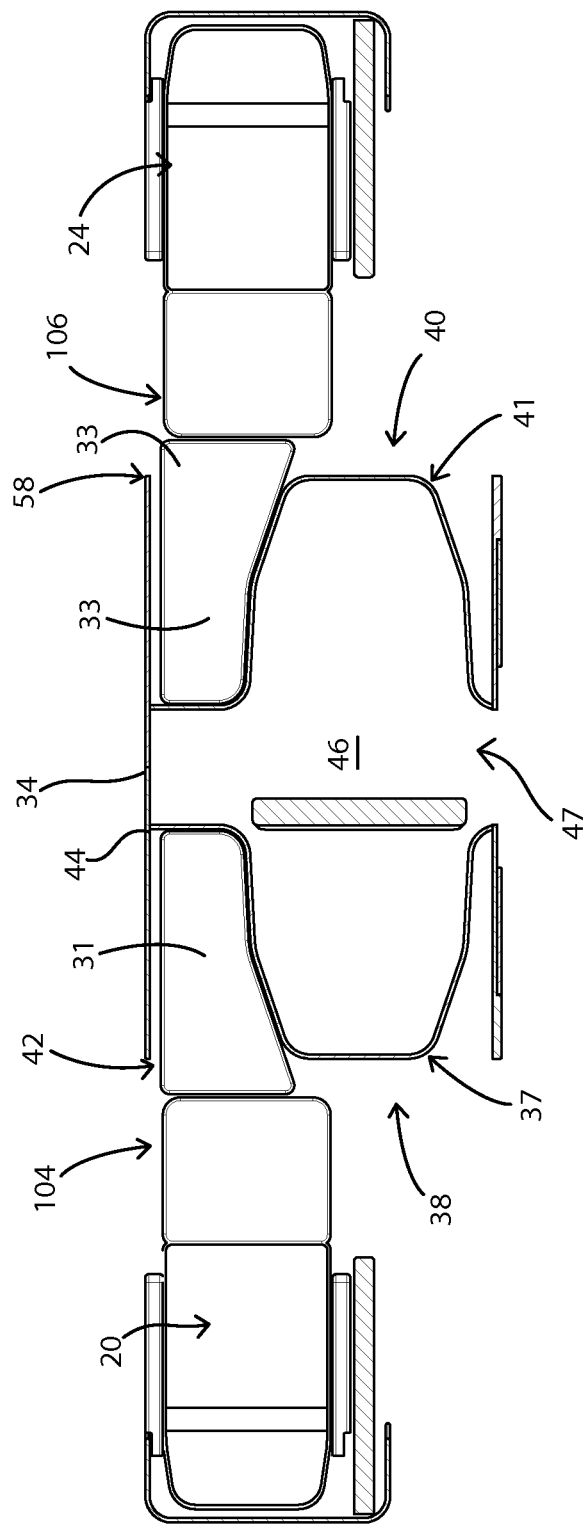
FIG. 3 depicts an example 3-seat grouping seating arrangement.

The compartment shell 26 can include one or more shell base structures that cooperate with shell 26 sidewalls to provide the legwells 30, 32. FIGS. 2 and 3 show perspective views of the arrangement 10 in which a portion of the shell structure 26 is cut away. As can be seen from the Drawings, a first shell base structure 38 can cooperate with the shell sidewall 34 to form the legwell 30, and a second shell base structure 40 can cooperate with the sidewall 34 to provide the second legwell 32. The first and second shell base structures 38,40 can shape and taper the legwells 30, 32 so that they are similarly shaped with a wider leg receiving end 43 and narrower terminus end 44 that directs the feet of a passenger in a standard seat to the sidewall 34. Footrests 31, 33 disposed at the legwells 30,32 respectively can conform to the tapered shape and mirror one another. The first and second shell base structures 38 and 40 can define a central sitting area 46 for the compartment 16 in which the center seat 28 can be disposed.

The shell base structures 38, 40 can each include a generally vertical basewall support member and a generally horizontal base topper member disposed atop the basewall support member. Basewall support members are configured to define and contour the legwells 30, 32 and the sitting area 46, while base topper members are configured to cover exposed space between basewall support members and compartment shell 26 endwalls 52,56 and sidewalls 34, 35, 45, to provide support and surface area for the compartment 16.

Figure 4:
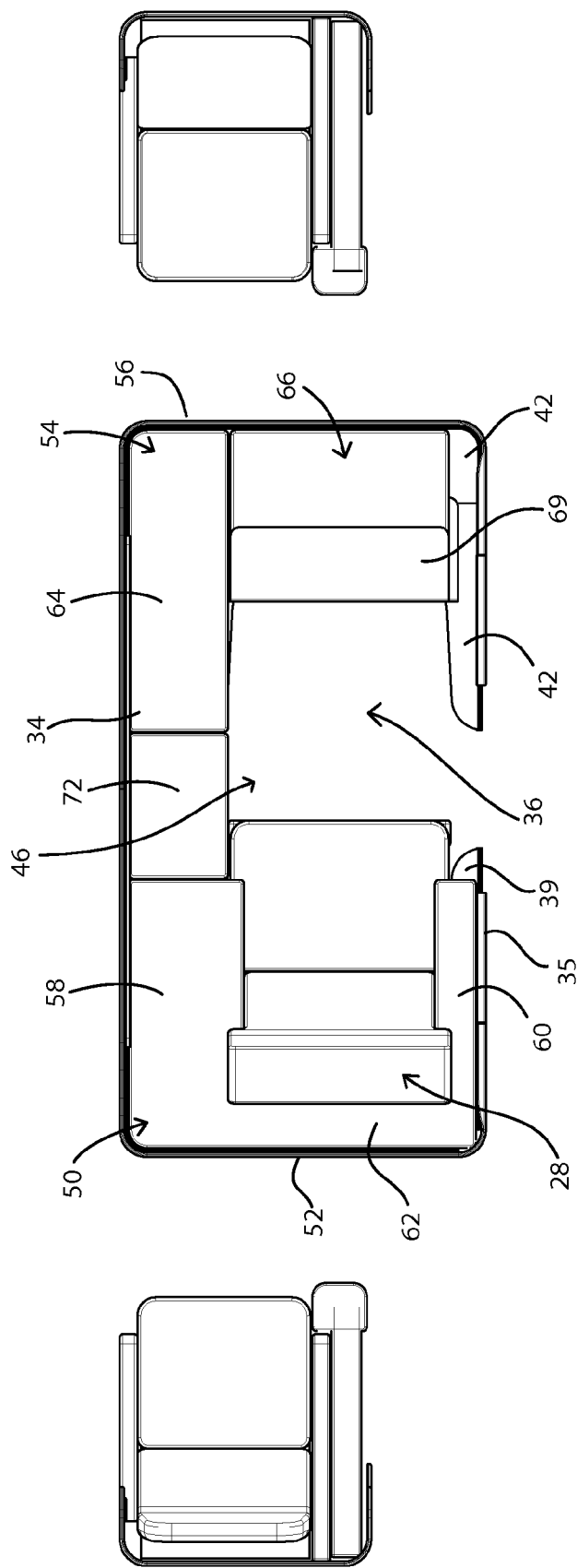
FIG. 4 depicts an example 3-seat grouping seating arrangement.
Figure 7:
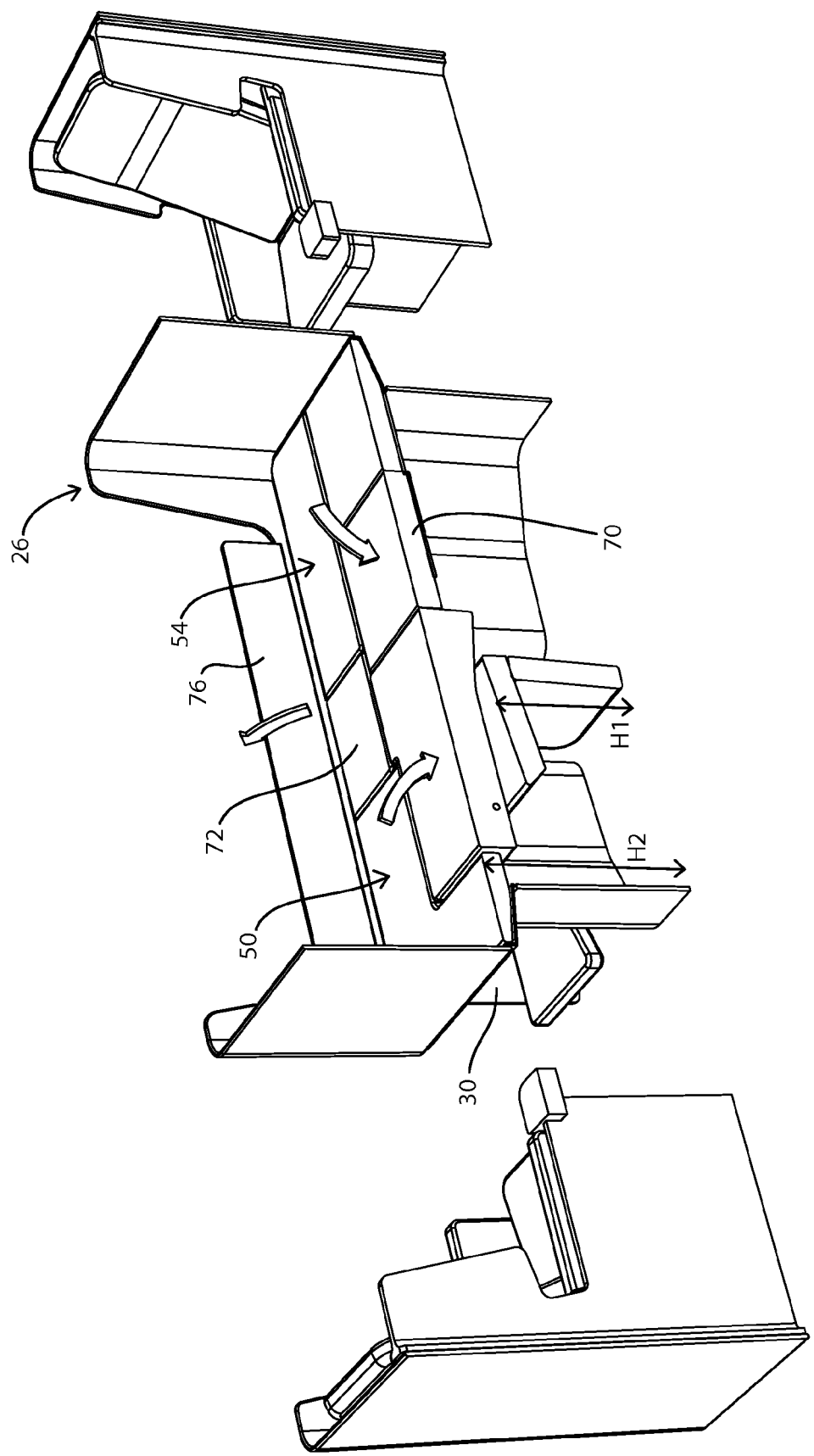
FIG. 7 depicts an example 3-seat grouping seating arrangement.

For example, the shell base structure 38 can include a basewall support 37 that can be best seen in the cut-away views of FIGS. 2, 3 and 7; and a base topper 39 that can be best seen in FIGS. 1 and 4. The base topper 39 can be embodied as a unitary portion, or can comprise a plurality of segments. The base topper 39 can be shaped to conform to area between the basewall support 37 and the endwall 52 and between the basewall support 37 and the sidewalls 34 and 35. For example, referring to FIG. 1, the base topper 39 can be seen exposed adjacent sidewall 35. Likewise, the shell base structure 40 can include a basewall support member 41, and a base topper member 42. The base topper member 42 can be disposed between the basewall support member 41 and the endwall 56, and between the basewall support member 41 and the sidewalls 34 and 45. For example, in FIG. 4, the base topper 42 can be seen atop the basewall support member 41 adjacent the sidewall 45. As can be seen from the drawings, the base structures 38, 40 provide a generous amount of vertical space within the legwells 30 and 32, making it easier for a standard seat passenger to reposition his or her feet or legs. This feature may be particularly advantageous for transcontinental or intercontinental trips.

Figure 5:
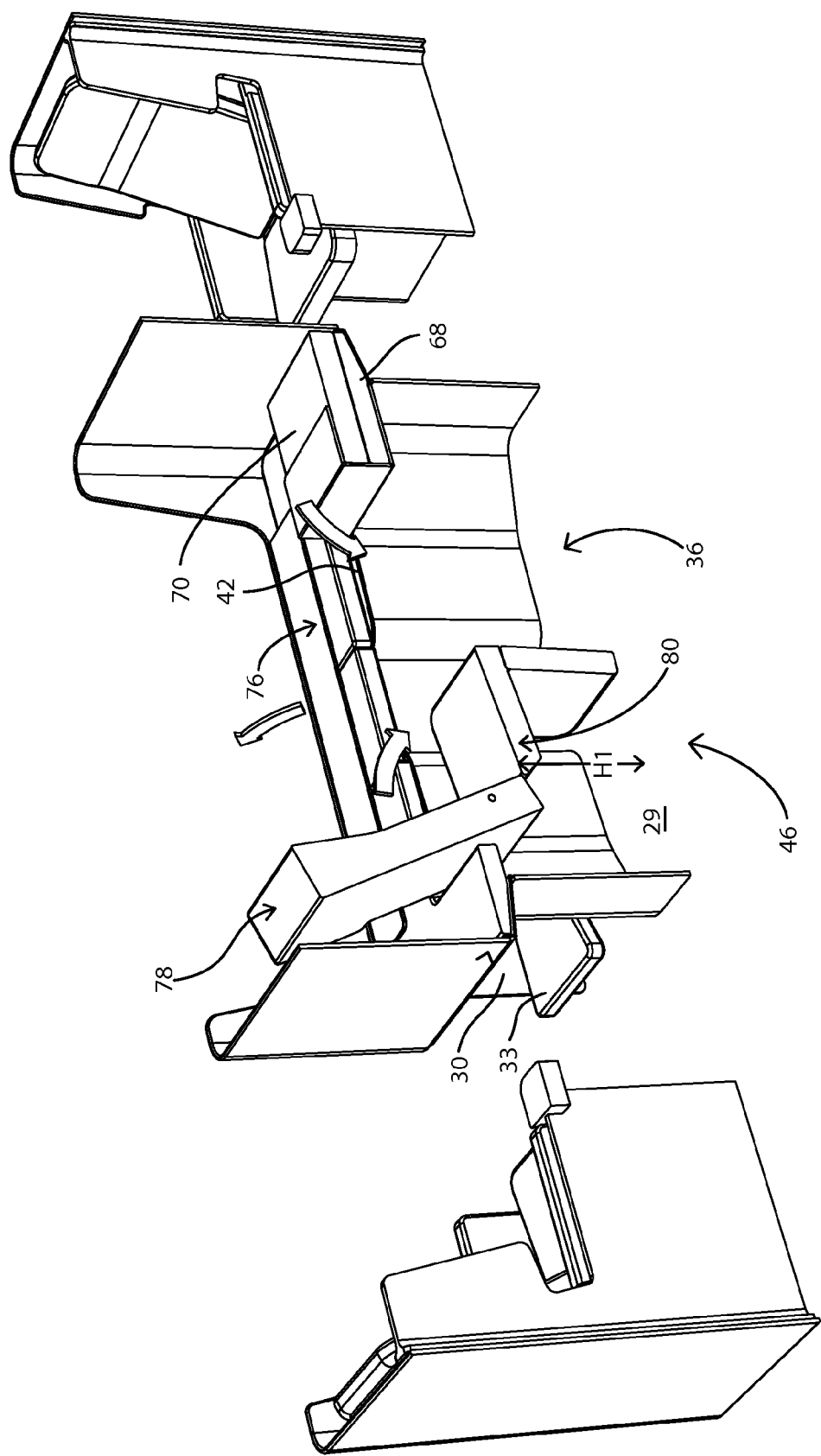
FIG. 5 depicts an example 3-seat grouping seating arrangement.

The premium compartment 16 can further include "apron" sections that can be disposed above the base support structures 38, 40 to border the seating area 46 within the compartment 16. The apron sections provide enhanced surface area that can be used in combination with the seat 28 to provide a wide bed for a compartment 16 passenger. Referring to FIGS. 4,5, a first apron 50 at a first shell endwall 52, and a second apron 54, at a second shell endwall 56 can be disposed above the shell base structures 38, 40 to border the sitting area 46 and the seat 28. In an exemplary embodiment, the aprons 50, 52 may be configured to lie atop base toppers 39 and 42, as shown in FIGS. 4-6, 8-9.

In an example embodiment, the aprons 50, 54 can be mounted to their respective endwalls 52, 56. The first apron 50 can include a first side section 58 disposed over the legwell 30 between the seat 28 and the sidewall 34, a second side section 60 disposed between the seat 28 and a sidewall 35, and a rear section 62 disposed between the seat 28 and the endwall 52. The side sections 58, 60 provide sleeping surface for reclined passengers, and can provide arm support for a seated passenger as well as surface area for a workspace. The rear section 62 can support the head of a reclined passenger. The apron 50 can comprise a unitary structure, or can comprise a plurality of contiguous pieces.

In an example embodiment, the second apron 54 can be disposed over the second shell base structure 40 and can include a side section 64 disposed over the legwell 32, and a footrest support 66 adjacent the side section 64. The side section 64 can provide additional surface area for the compartment 16 that can be availed for passenger use. The footrest support 66 can be configured to function as a table or work surface for a seated occupant, and configured to provide foot support for a reclined passenger. By way of example, the footrest can overlap the legwell 32. In an exemplary embodiment, the footrest support 66 can comprise a fixed member 68 at the endwall 56 that is coupled to a movable leg support member 70. The leg support member 70 can rest atop the fixed member 68 in a stowed position, and be extended outward toward the seat 28 in a deployed position to support the legs of a reclining compartment 16 passenger.

Figure 6:
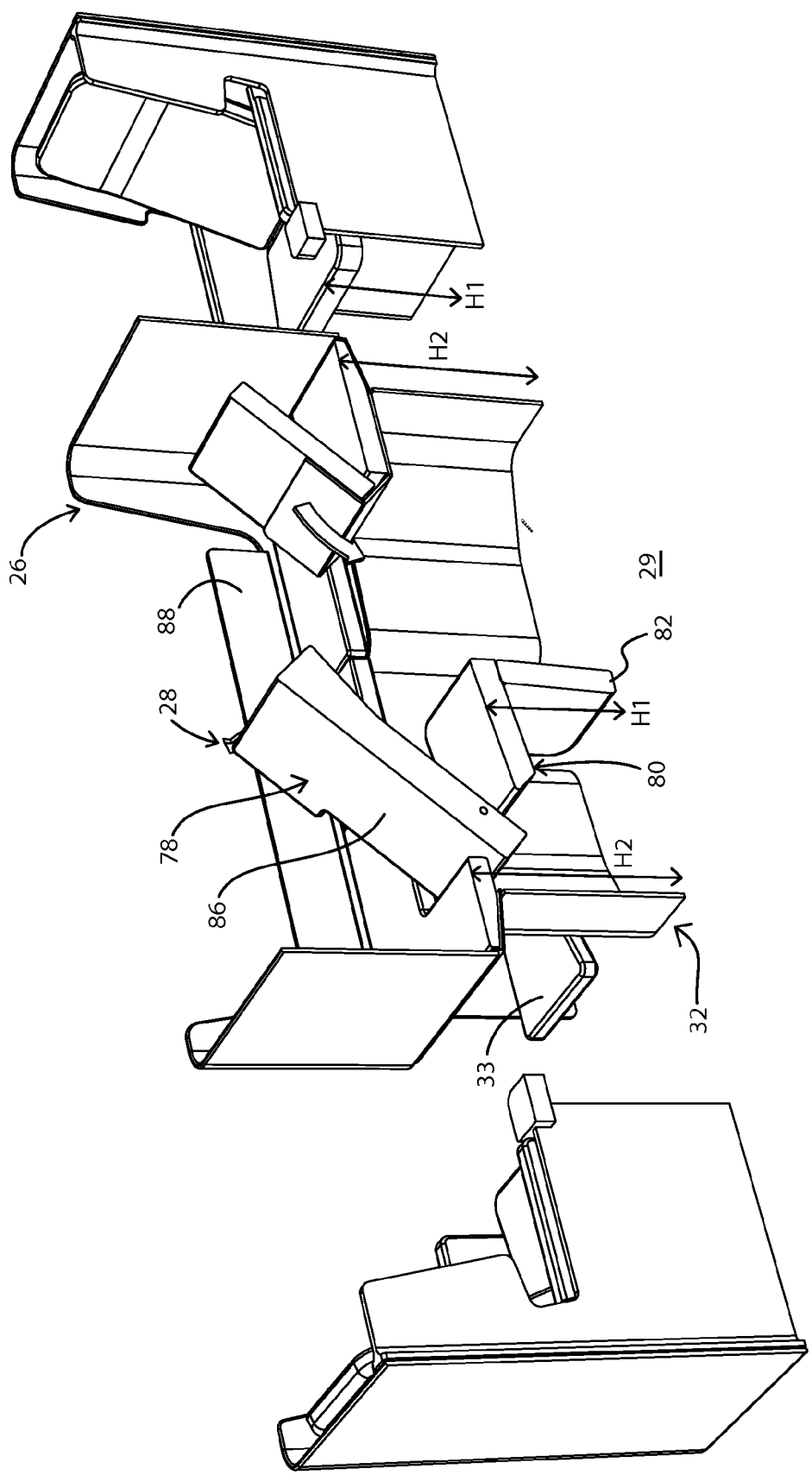
FIG. 6 depicts an example 3-seat grouping seating arrangement.

An infill component 72 can be disposed between the first and second aprons 50, 54 to cover any gap therebetween. In an example embodiment, the infill component 72 can be disposed to provide surface area over space 74 between the legwells 30 and 32 formed by the first and second shell base structures 38 and 40. Space 74 between the legwells 30 and 32 can be used for stowing carry-on items belonging to a compartment 16 passenger. An exemplary embodiment can further include a side table 76 movable between a raised generally upright position and a resting generally horizontal position. In a horizontal position (See FIG. 5), the side table 76 can be configured to lay atop the aprons 50, 54 and the infill component 72. The side table 76 can provide a smooth, firm support surface conducive for eating, writing, supporting electronic devices, etc. The side table 76 can be configured to move from the deployed position to an upright stowed position as shown in FIG. 6. For example, the side table 76 can be pivotably coupled to the compartment shell 26 by hinges (not shown). The side table 76 can be configured to remain in a stable upright position until lowered by an occupant. When moved to an upright position, the side table 76 can provide lateral support and security to objects placed on either of the aprons 50, 54 or the infill component 72. A private pass-through 47 for a compartment 16 passenger can be disposed between the sidewall 35 and the sidewall 45.

Figure 8:
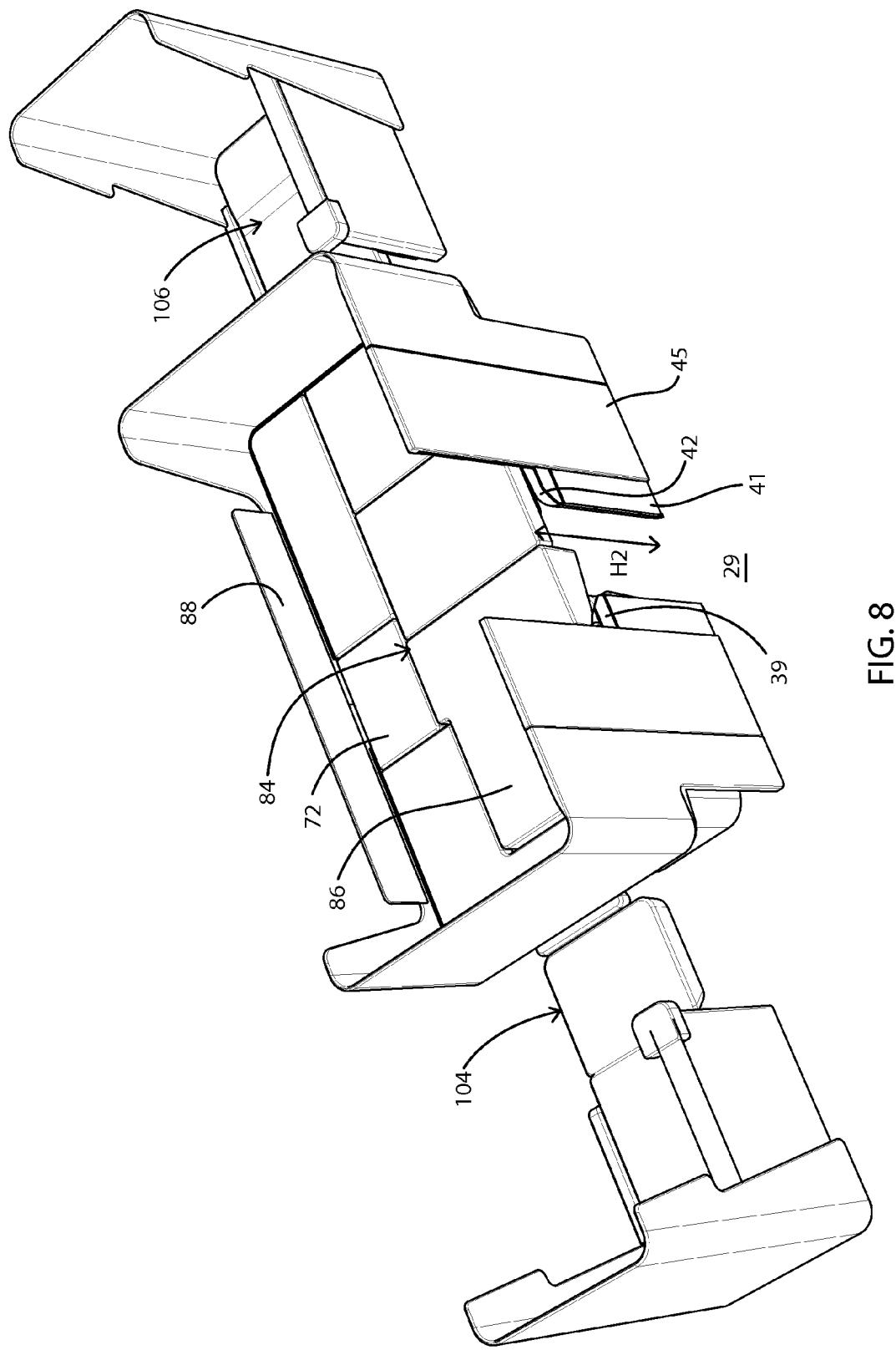
FIG. 8 depicts an example 3-seat grouping seating arrangement.
Figure 9:
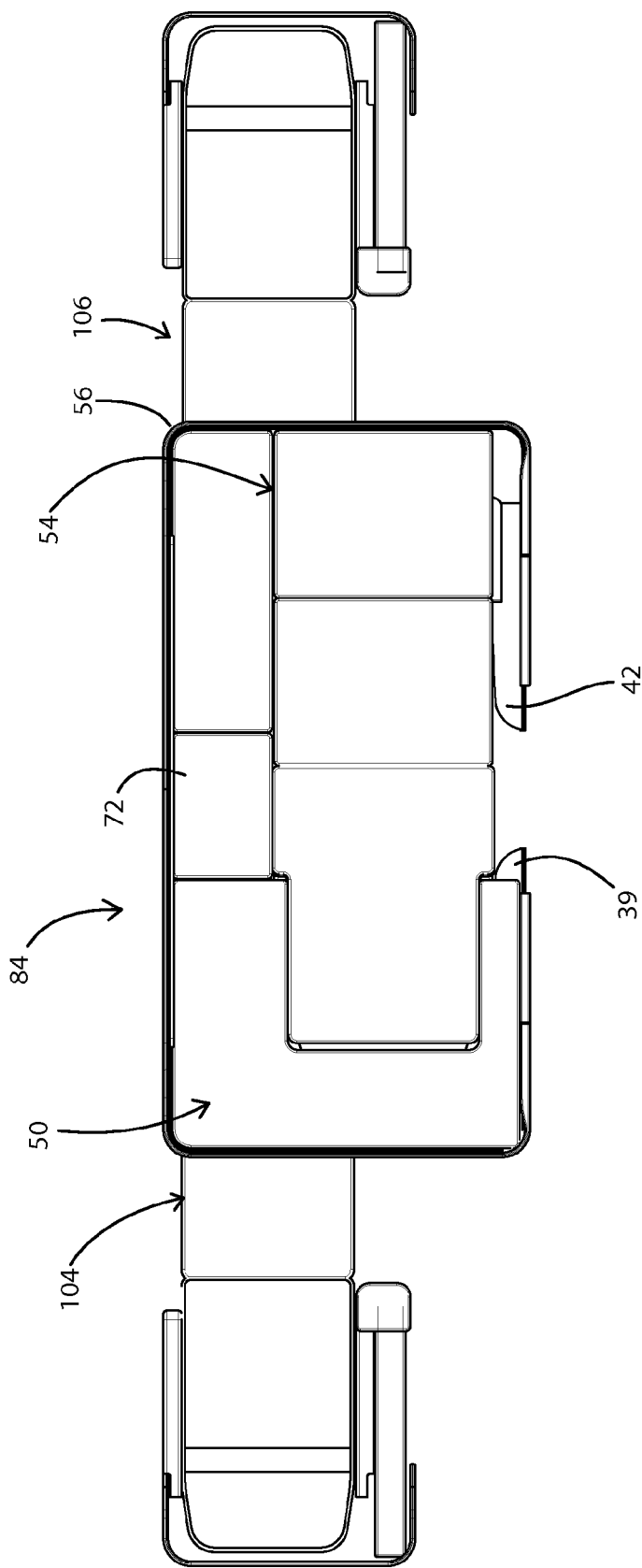
FIG. 9 depicts an example 3-seat grouping seating arrangement.

The center seat 28 can be configured to cooperate with the compartment shell 26 to provide a bed for a center occupant when it is moved to a lie-flat position. Various means can be employed to convert the center seat 28 to its lie-flat orientation. In an example embodiment, the center seat 28 can have a seat back configured to fold forward. For example, as shown in FIGS. 5-7, the seat 28 can include a seatback component 78 and a seat pan component 80 that can be coupled to a seat support/leg rest component 82 configured to support the seat 28. The seatback component 78 can be configured to fold forward to overlie and reset upon the seat pan component 80. The transition from an upright to a lie-flat position can be performed by mechanical means, electronic means or by a combination of both. By way of example, the center seat 28 can be configured to operate in a manner described by PCT Publication WO 03/13903 A1 to Virgin Atlantic Airways Limited, filed on Aug. 9, 2002, which is incorporated herein in its entirety by reference. As shown in FIGS. 5-9, when folded forward to a lie-flat mode, the seat 28 can cooperate with the aprons 50,54 at the compartment shell 26 to provide a generally contiguous horizontal surface that can be used as a passenger bed. For example, the side table 76 can be moved to an upright position, the leg support member 70 can be extended out in a deployed position, and the first apron 50, the infill component 72, the second apron 54 and the seatback 78 can cooperate to with the leg support member 70 to provide a bed 84. Because the aprons 50,54 extend over both legwells 30 and 32, they provide additional sleeping area, making the bed 84 wider than the seat 28. As shown in FIG. 8, the bed 84 can be disposed at a height H2 above the initial H1 at which the seat 78 is disposed in its upright position.

The aprons 50, 54 and the infill component 72 can be manufactured with sufficient strength and integrity to support a reclining passenger, and in an example embodiment, aprons 50,54 and the infill component 72, can comprise or be upholstered in a material that can provide a comfortable sleeping surface. In an example embodiment they can comprise cushions or padding. Likewise, the seat back component 78 can be configured to offer a comfortable sleeping surface, for example, it can have an upholstered, cushioned or padded rear surface 86. The side table 76 in its stowed position can provide lateral support for a sleeping occupant that rolls to that side of the bed. Accordingly, its lower surface 88 can be padded or cushioned in the same manner.

Figure 10:
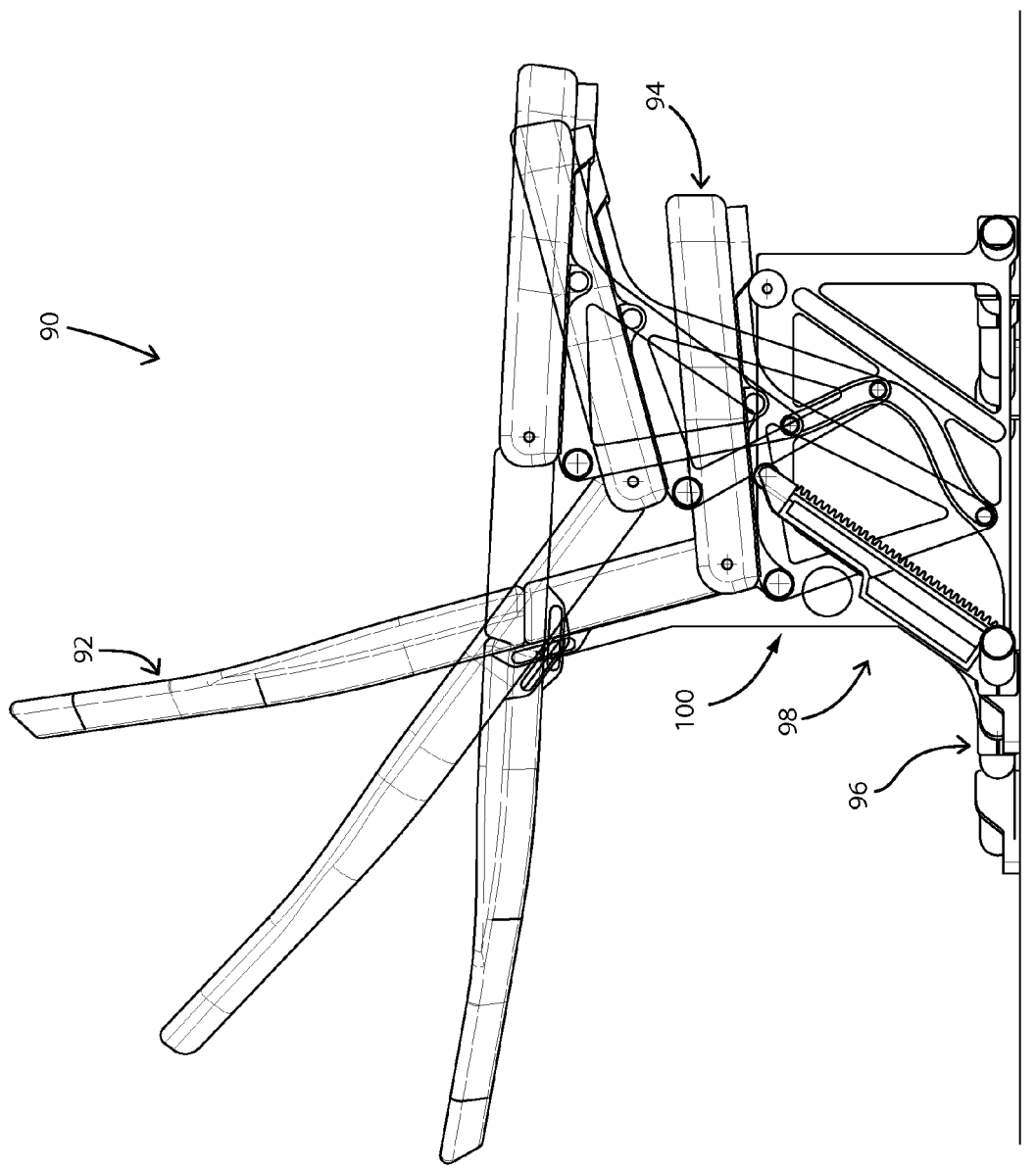
FIG. 10 depicts an example seat configured for vertical translation.

While depicted here as configured to fold down to provide lie-flat seating, it is contemplated that the compartment 16 can include a seat configured to convert to a lie-flat mode by a different means. For example, in a further embodiment, the compartment 16 can be configured to comprise a center seat that is configured to vertically translate from a lower position to a higher position when moving from an upright to a lie-flat mode. By way of example, a center seat can be configured as discussed in U.S. patent application Ser. No. 13/481,721 to Henshaw filed on May 25, 2012, which is incorporated herein in its entirety by reference. FIG. 10 shows an example vertically translating seat 90 having a seat back component 92 and a seat pan component 94. As shown in FIG. 10, a center translating seat 90 in an upright mode can be mounted on seat tracks 96 on the vehicle cabin floor 29. By having a seat configured to translate upward to a reclined position from a lower upright position, an arrangement can exploit vertical space without imposing undesirable loads on a seat track during takeoff. A translation means 98 can cooperate with a seat pan articulation member 100 to elevate the seat above the aircraft floor. When returned to an upright mode, the seat 90 can be translated back to its original lower disposition. In an example embodiment, the seat 90 can be translated horizontally as well as vertically when transitioned between the upright and lie-flat modes. Other means for converting a seat to a lie-flat mode may occur to those skilled in the art.

In an example embodiment, when a center seat comprises a vertically translating seat such as the seat 90, aspects of the compartment 16 can be adapted to use the seat 90 to provide a premium bed. For example, an apron disposed at the first endwall 52 may omit the rear section 62 since the seatback component 92 can provide head support for a reclining passenger. For example, the base topper 39 can be configured to receive the reclined seatback component 92. This allows the seatback component 92 to be disposed at the same elevation as aprons in the compartment 16. Furthermore, since the seat 90 can include a leg rest portion 198 (FIG. 14) that can support the legs of a reclined passenger, a footrest structure for the compartment 16 need not include the movable leg support member 70. Instead, the fixed member 68 can be appropriately sized to proximate the extended leg rest 198.

The compartment shell 26 can be configured with various features for a compartment 16 occupant, such as, but not limited to, an in-flight entertainment center, and safety equipment and other accessories (not shown). In an example embodiment, the second endwall 56 can be used to mount such features.

In FIGS. 1-3, the fore- and aft-facing seats 20 and 24 are depicted in an upright mode. However, the fore- and aft-facing seating assemblies 12 and 14 can comprise seats configured to be convertible between a sitting position and a lie-flat position. For example, the standard seats 20 and 24 can be embodied as described in U.S. Pat. No. 8,118,365 issued to Henshaw, and U.S. patent application Ser. No. 13/410,834 to Henshaw filed on Mar. 2, 2012, and U.S. patent application Ser. No. 13/481,721 to Henshaw filed on May 25, 2012, all of which are incorporated herein in their entirety by reference. In an example embodiment, the fore-facing seating assembly 12 can cooperate with the footrest 31 at the legwell 30 to provide a bed 104 for an occupant, and the aft-seating assembly 14 can cooperate with the footrest 33 at the legwell 32 to provide a bed 106. As shown in the Drawings, the standard seating assemblies 12, 14 can be arranged generally parallel with the compartment 16.

The compartment shell 26 can be configured with sidewalls 34, 35,36 arranged generally perpendicular to the endwalls 52, 56, and endwalls 52, 56 generally parallel with each other to provide a premium bed of generally uniform width and length. As can be seen from the FIG. 8, the center bed 84 can be larger than the beds 104,106 for fore- and aft-facing passengers respectively, and can be disposed at a higher height above the cabin floor 29. Because the compartment 16 can provide a larger sleeping area, larger personal space, and greater privacy for an occupant, it can merit premium pricing over the seating assemblies 12 and 14. In addition, unlike premium seating in many aircraft in which higher priced seating is segregated by cabin, the arrangement 10 integrates the higher priced compartment 16 seating with the lower priced seating of seats 20, 24 to generate higher revenue without compromising seating density. As shown in FIGS. 1-9, the seats 20, 24 and 28 can all be arranged generally parallel with a notional longitudinal axis or linear dimension of the compartment 16. In an example embodiment, the seats 20, 24, 28 are configured to be parallel to the linear dimension of an aircraft.

In a further embodiment, an arrangement provides double occupancy standard seating and an expanded center seating assembly embodied as an executive suite having enhanced personal space for a center passenger. FIGS. 11-18 show a 5-seat grouping 110 that includes a fore-facing standard seating assembly 112, an aft-facing standard seating assembly 114 and a center assembly 116 disposed between the assemblies 112 and 114. The fore-facing seating assembly 112 can include a support shell 118, a first fore-facing seat 120 and a second fore-facing seat 122. The aft-facing seating assembly 114 can comprise a support shell 124, a first aft-facing seat 126 and a second aft-facing seat 128. The seats 120, 122, 126, 128 can be standard seating convertible between an upright and a lie-flat position and configured to recline in the same manner as the seats 20,24 of the 3-seat grouping 10, i.e. a seatback can recline, and a seatpan can move forward while dropping to a lower vertical height. Thus, the 5-seat configuration 110 can provide lie-flat seating for all occupants, and mix premium seating with lower-cost options to provide high density seating arrangements. The standard assemblies 112, 114 and their seats can be arranged parallel with the center assembly 116 and each other to provide high density seating in a non-angled arrangement.

The center assembly 116 can be embodied as an executive suite that can include a center shell structure 134 and a center seat 136, which can be configured to convert from an upright position to a lie-flat position. Designed to provide business-class or premium seating, the center suite shell structure 134 can provide separation, privacy, and generous personal space for an occupant. Base toppers provide additional surface area and living space, while generous aprons can cooperate with the center seat 136 to provide a large premium bed disposed at an elevated height. Leg space for standard seating passengers is efficiently arranged to provide additional space for the executive suite 16 without compromising the comfort of passengers in standard seats.

The center suite shell structure 134 can provide leg and foot space for reclined fore-facing and aft-facing passengers of the fore- and aft-facing seating assemblies 112 and 114 that is not overlapped by the seat 136. For example, a first legwell 138 can be configured to receive the feet of a reclined passenger of the first fore-facing seat 120, and a second legwell 140 can be configured for receiving the feet of a reclined passenger of the second fore-facing seat 122. Footrests 31,33 can be disposed at the legwells 138, 140 respectively to support a reclining passenger's legs and feet. To accommodate aft-facing passengers, the shell structure can provide a third legwell 160 and a fourth legwell 162, each of which can accommodate a footrest 33, 31. Disposition of the 138, 140 legwells can allow standard seating passengers to recline comfortably, while providing additional space to a center suite 116 occupant.

Figure 15:
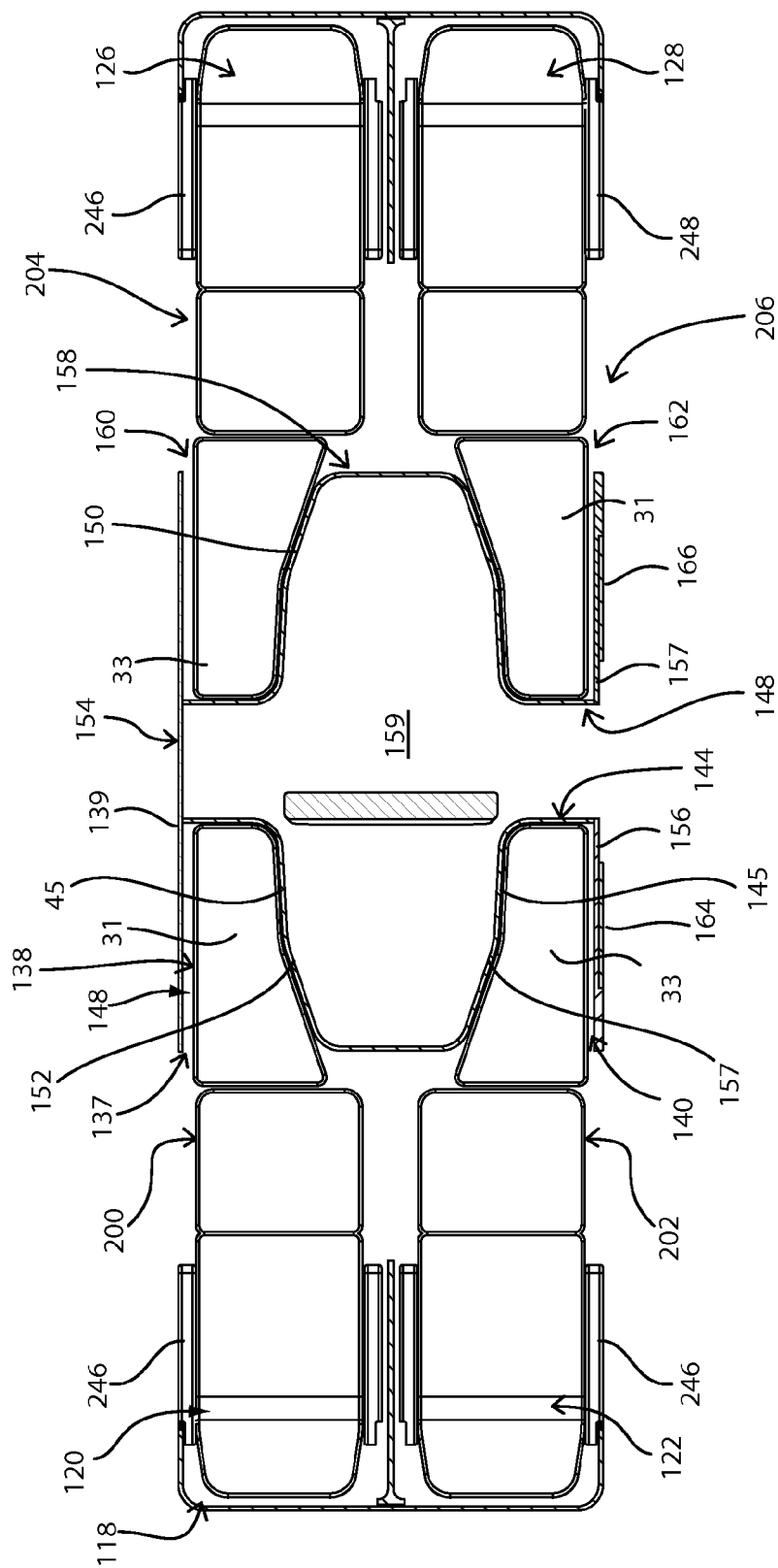
FIG. 15 depicts an example 5-seat grouping seating arrangement.

By way of example, as shown in FIG. 15, a first shell base structure 144 can define the legwells 138, 140 and a second base structure 148 can define the legwells 160, 162. Together the first and second base structures 144, 148 define a central passenger sitting area 159 for the suite 116. The center seat 136 is disposed in the central sitting area 159 straddled by the legwells 138, 140.

The shell base structures 144, 148 can each include a generally vertical basewall support member and a generally horizontal base topper member disposed atop the basewall support member. Basewall support members are configured to define and contour the legwells 138, 140, 160, 162 and the sitting area 159, while base topper members are configured to cover space between basewall support members and compartment shell 134 endwalls and sidewalls, thereby providing support and surface area for the suite 116.

Figure 11:
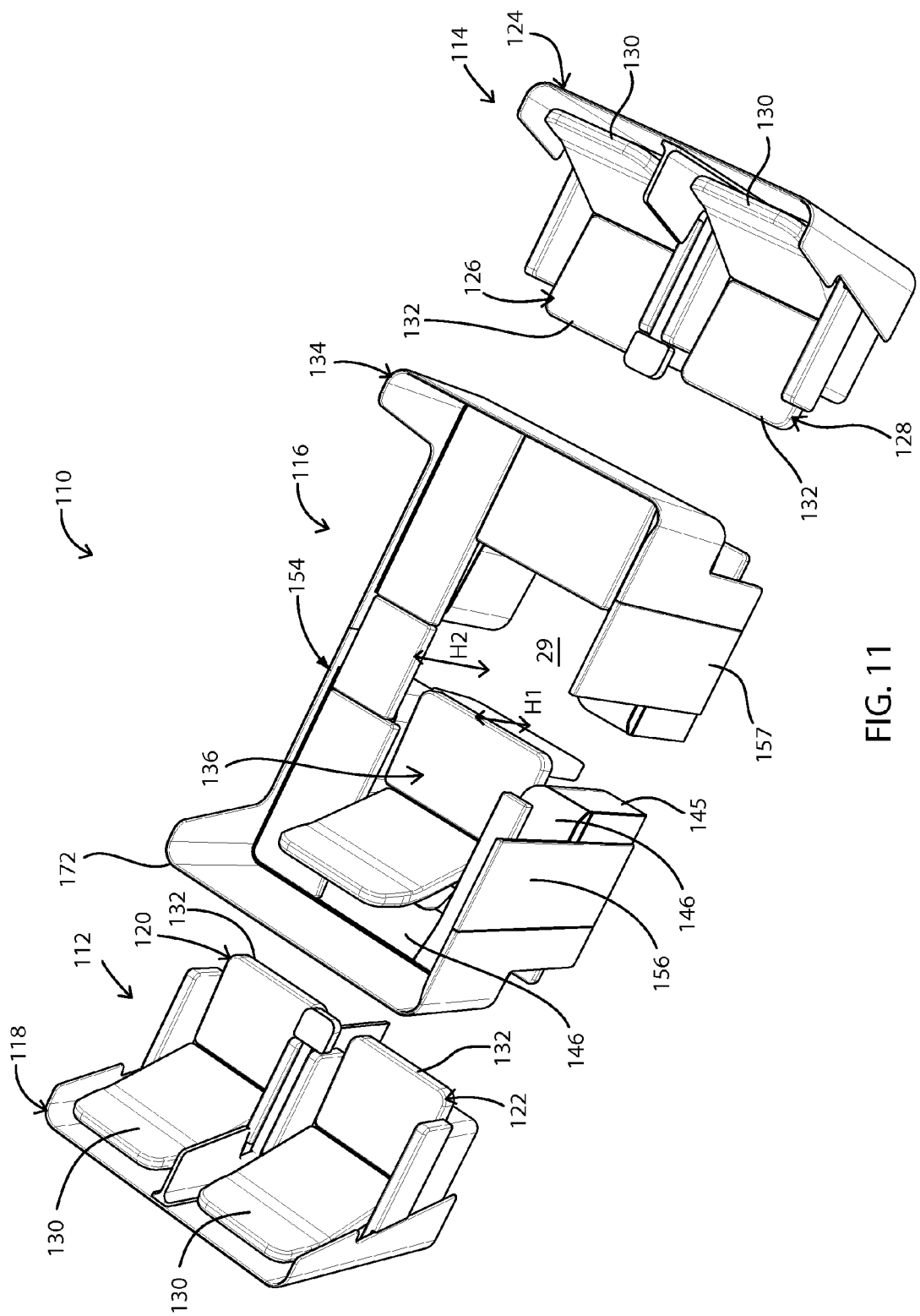
FIG. 11 depicts an example 5-seat grouping seating arrangement.
Figure 12:
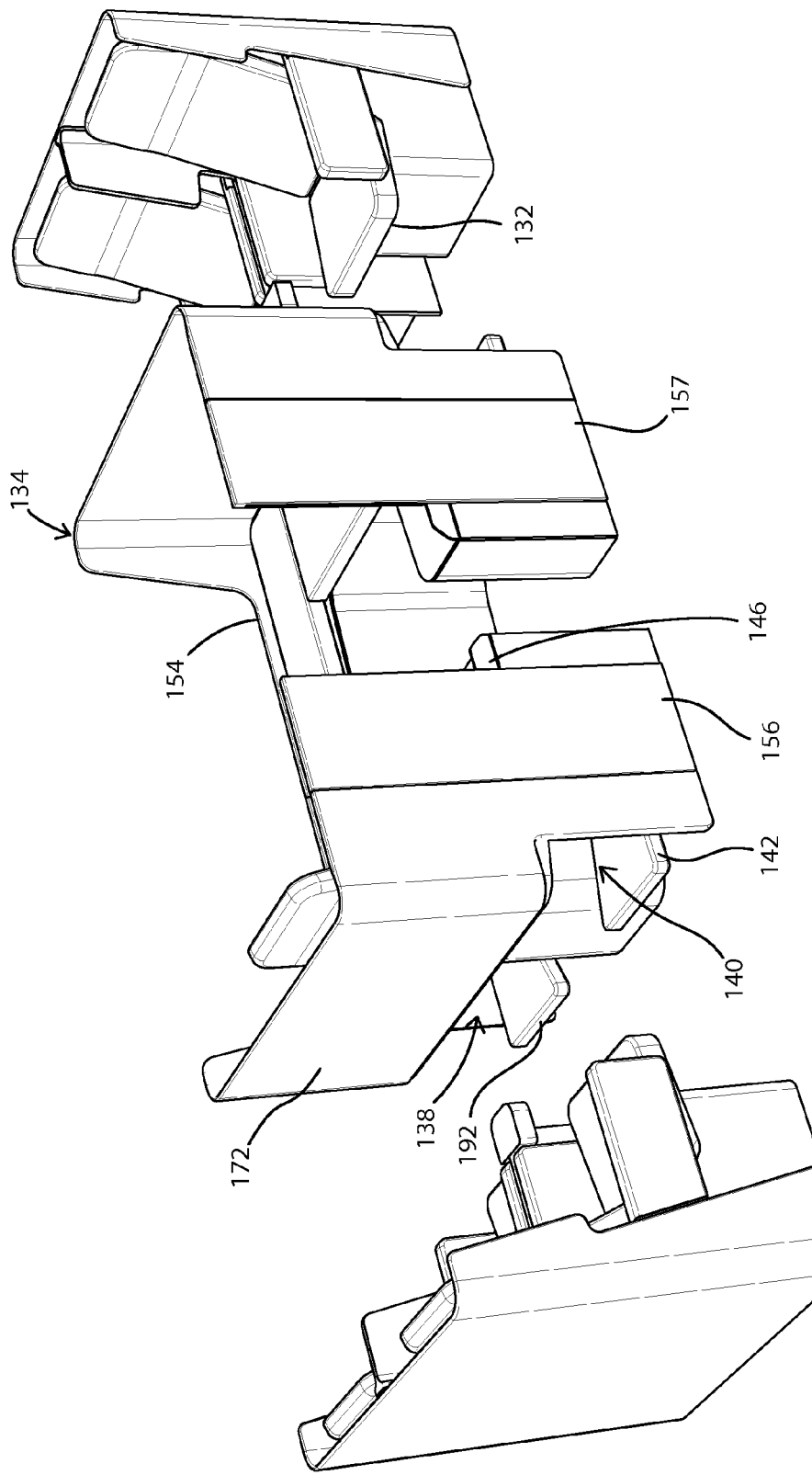
FIG. 12 depicts an example 5 seat grouping seating arrangement.
Figure 13:
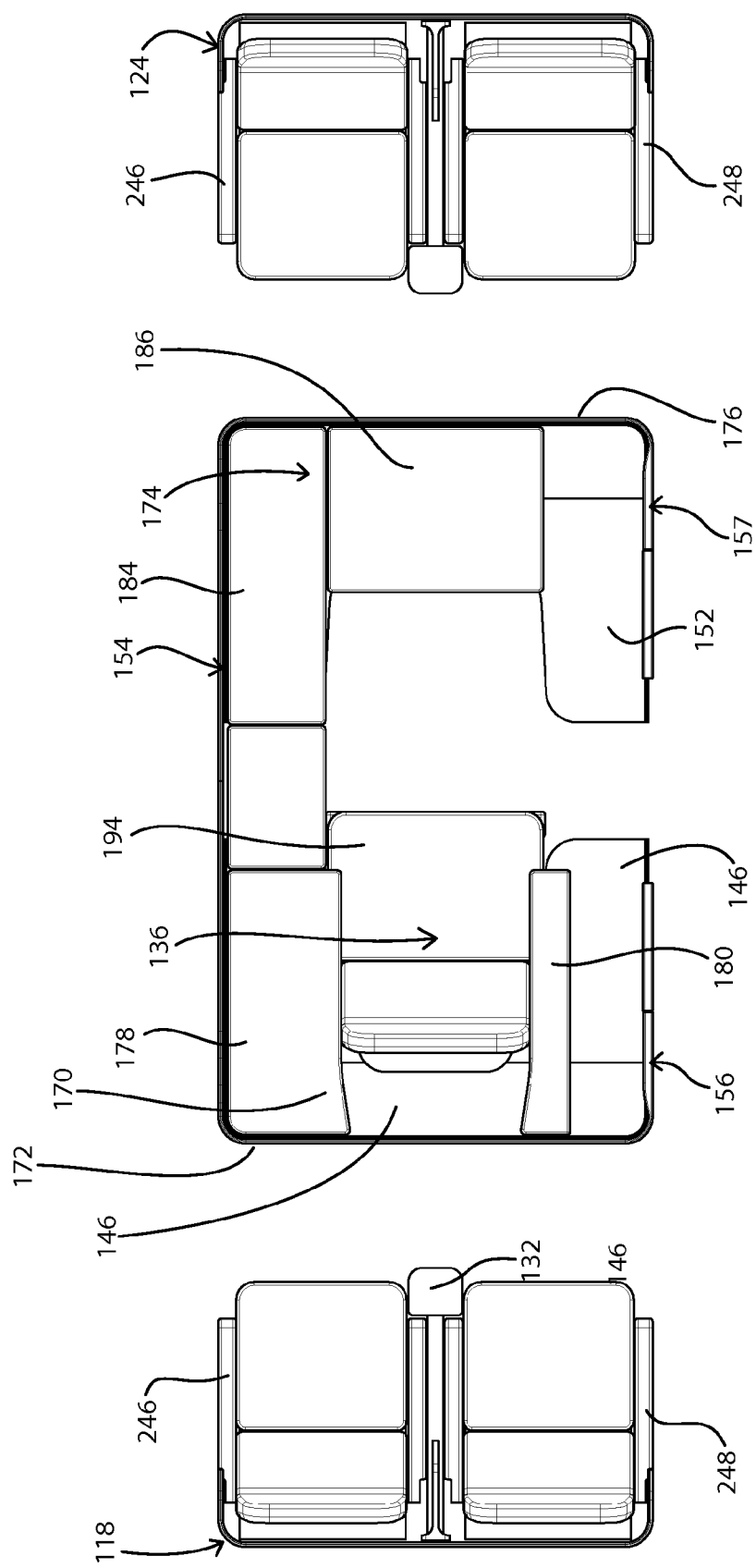
FIG. 13 depicts an example 5-seat grouping seating arrangement.

For example, the shell base structure 144 can include a basewall support member 145 that can be best seen in the cut-away view of FIG. 15; and a base topper 146 that can be seen in FIGS. 11, 12. The base topper 146 can be embodied as a unitary portion, or can comprise a plurality of segments. The base topper 146 can be shaped to conform to area defined by the basewall support 145 and a suite 116 endwall 172 and sidewalls 154 and 156. For example, referring to FIG. 11, the base topper 146 can be seen atop the basewall support 145 and over the legwell 140 adjacent the sidewall 156. Likewise, the shell base structure 148 can include a basewall support member 150, and a base topper member 152. The base topper member 152 can be configured to cover space between the basewall support member 145 and the sidewall 154, between the basewall support member 145 and the sidewall 156, and between the basewall support member 145 and the endwall 176. For example, the base topper 152 can be seen in FIG. 13 over the legwell 162. The base topper 146 can be embodied as a unitary portion, or can comprise a plurality of segments. Thus the base toppers 146, 152 cover the legwells 138, 140, 160, 162 providing ample vertical space for standard seat passengers and valuable surface area for the suite 116.

Legwells 138,140 can be shaped by the structure base structure 144 to be wider at a mouth 137 and narrower at a terminus 139. As can be seen from FIG. 15, the legwells 138,140 can be configured to mirror one another. The legwell 138 can have a generally straight side comprising a portion of a shell structure sidewall 154, and an angled and tapered side comprising a portion of the shell structure base structure 144. Similarly, the legwell 140 can have a generally straight side comprising a portion of a shell structure side wall 156, and an angled tapered side comprising the shell structure base structure 144. Due to their shape, the legwells 138, 140 can direct the legs and feet of a reclining passenger toward the nearest shell sidewall, and away from an adjacent passenger.

The legwells 160 and 162 are shaped similar to the legwells 140 and 138. The legwells 138 and 140 can be provided in a mirrored arrangement about the center seat 136, as can the legwells 160 and 162. Furthermore, as shown in FIGS. 11-18 legwells 138 and 160 can be disposed in a mirrored opposing relationship, as can the legwells 140 and 162.

The center shell structure 134 can further provide a pass-through 163 for a passenger of the center suite 116, disposed between the sidewalls 156, 157 and the legwells 140,162. In an example embodiment, sliding privacy doors can be configured to close across the pass-through 163 to provide separation and privacy for an occupant, particularly when sleeping. For example, a first door 164 can be disposed at the sidewall 156, and a second door 166 can be disposed at the sidewall 157.

The executive suite 116 can also include "apron" sections that can be disposed above the base support structures 144, 148 to frame the seating area 159. Apron sections can provide enhanced surface area that can be used in combination with the seat 136 to provide a wide premium bed for a suite 116 passenger. For example, a first apron 170 can be provided at the first endwall 172 above the shell base 144, and a second apron 174 can be provided at the second endwall 176 over the base structure 148 to border the central sitting area 159. In an exemplary embodiment, the aprons 170, 174 may be configured to lie atop base toppers 146 and 152, as shown in FIG. 11. However, it is contemplated that the aprons 170,174 can be disposed directly atop the base structures 144,148. In an example embodiment, the aprons 170,174 can be attached to their respective endwalls 172, 176. The first apron 170 can comprise a first side section 178 disposed over the legwell 138, and a second side section 180 disposed over the legwell 140. Between the side sections 178, 180 the base topper 146 can be exposed. In an example embodiment, the first and second sections 178 and 180 can serve as opposing armrests for a seated passenger.

In an example embodiment, the second apron 174 can include a side section 184 and a footrest support 186. The side section 184 can be disposed over the legwell 160. The footrest support 186 can be disposed between the legwells 160,162 and can be configured to overlap at least one of them, and may overlap both. The footrest support 186 can function as a table for a seated passenger of the center suite 116, and can provide leg and foot support for a reclined passenger. The apron 174 can comprise a plurality of contiguous pieces, or a unitary piece. In an example embodiment, an infill component 188 can be disposed to cover any gap between the first and second aprons 170,174 and by doing so also cover any gap between the legwells 138,160. Beneath the infill component 188, space 190 between the legwells 138,160 can be used to stow carry-on items. In an example embodiment, the first apron 170, the second apron 174, the infill component 188 and the center seat 136 can cooperate to form a raised bed for a center suite 116 passenger when the sea 136 is moved to a lie-flat position.

In an example embodiment, when the seat 136 is set in an upright take-off position, its seat pan component 194 can be disposed at a height H1 above the vehicle cabin floor 29, which is generally the same as the height of a standard seat pan 132. However, when converted to provide lie-flat seating, it can cooperate with the shell structure 134 to provide a bed 192 disposed at a height H2, which is higher above the cabin floor 29 than the initial height H1. Various means can be used to convert a center seat of a 5-seat seating arrangement 110 to a lie-flat position. For example, in the FIGS. 11-14, the center seat 136 is configured for vertical translation in the same manner as the seat 90 depicted in FIG. 10.

Figure 14:
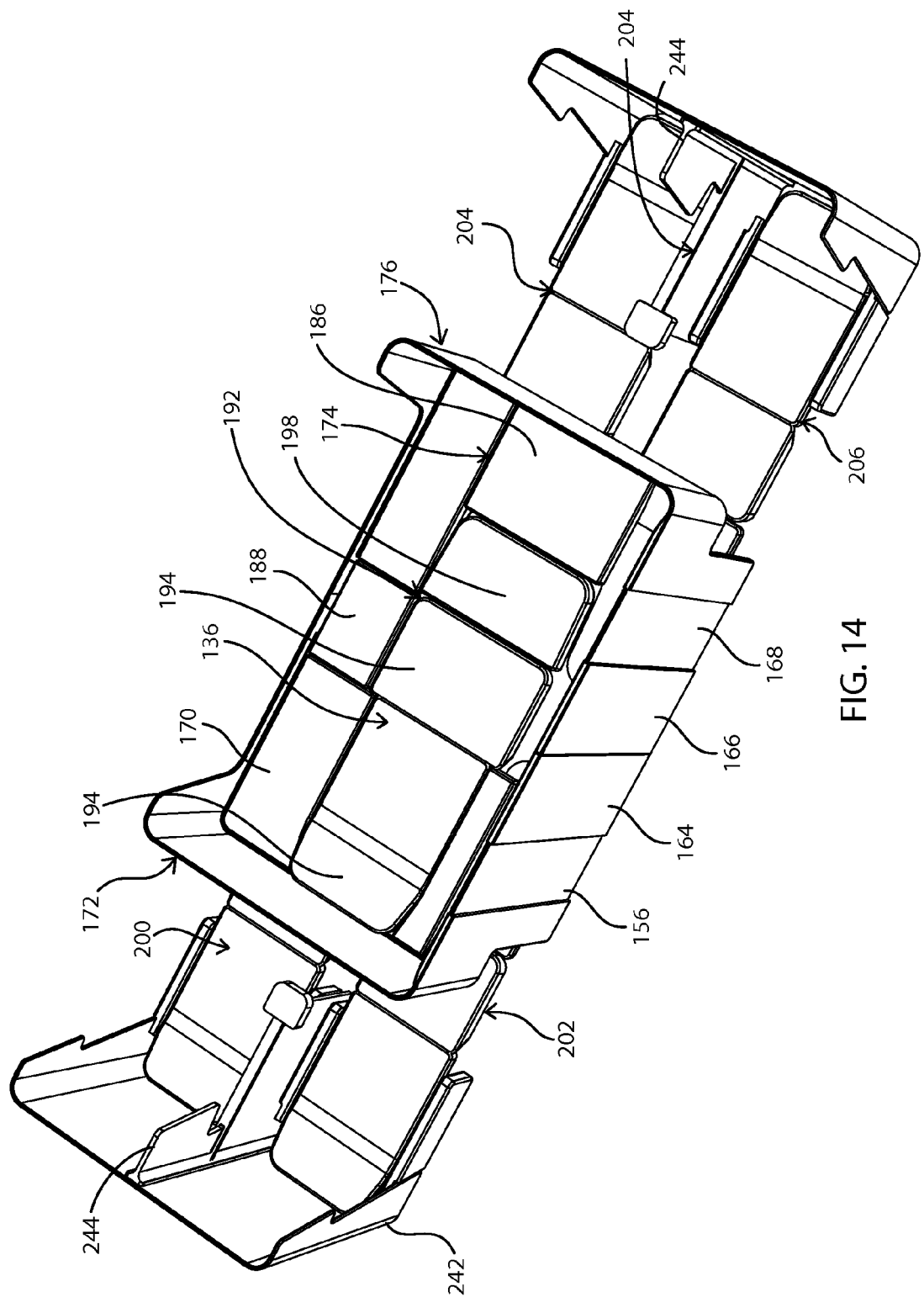
FIG. 14 depicts an example 5-seat grouping seating arrangement.

FIG. 14 shows the example embodiment 110 with the seat 136 converted to a lie-flat position. The base topper 146 can be configured to receive a reclined seatback component 196, and the seat pan component 194 can be raised up so that the seat 136 is generally coplanar with the aprons 170, 174. In an example embodiment, the seat 136 can comprise a leg rest portion 198 that can be pivotably coupled to the seat pan component 194 and can be configured to extend out in a deployed position toward the footrest structure 186 (see FIG. 14) when the seat 136 is converted to a lie-flat position. Accordingly, the first and second aprons 170, 174, the infill component 188 and the seat 136 can cooperate to provide a generally horizontal contiguous coplanar surface for the raised bed 192. In an example embodiment, the bed 192 is of generally uniform width and length. The aprons 170,174 provide additional surface area over the legwells 138,160 that can supplement the seat 136 length and width to provide the generous bed 192. Portions of the legwells 140, 162 that are not covered by the aprons 170,174 provide additional living space that add make the suite 116 roomy, private and comfortable.

Beds are also provided for passengers in standard seating assemblies. The first fore-facing seat 120 can be configured to cooperate with the footrest 141 disposed at the first legwell 138 to form a standard bed 200, and the second fore-facing seat 122 can be configured to cooperate with the footrest 33 disposed at the second legwell 140 to form a standard bed 202. In a similar manner, the first aft-facing seat 126 can cooperate with the footrest 33 disposed at the legwell 160 to provide a standard bed 204; and the aft-facing seat 128 can cooperate with the footrest 31 disposed at the legwell 162 to provide a bed 206. The beds 200-206 have a width that narrows from seat width to footrest 31 width, while the bed 192 of the suite 116 has a width that is greater than the width of the seat 136 and is generally uniform.

In an example arrangement, the width of the fore-facing seats 120,122 can be around 19", while the width of the center seat 136 can be noticeably wider, for example around 24". However, the shell structure 118 of the fore-facing seating assembly 112, the center suite shell structure 134, and the shell 124 of the aft-facing seating assembly 114 can all have generally the same width, and can be arranged parallel with each other. The shells 118, 134, 124 can be arranged parallel to each other in an arrangement in which a notional longitudinal axis of the center compartment 116 is parallel to a longitudinal axis of a vehicle cabin.

FIGS. 11-15 show the 5-seat grouping 110 having a center suite 116 with a seat 136 convertible to a lie-flat orientation by a seat pan component 194 configured for vertical translation to an elevated height above the cabin floor 29 as a seatback 196 is reclined backwards. However, it is contemplated that a center suite of a 5-seat grouping can accommodate a center seat that is convertible to a lie-flat position by other means. For example, FIGS. 16-19 show an example embodiment 111 in which a 5-seat grouping comprises a center suite 207 comprising a center shell structure 208 and a seat 210 configured to convert to a lie-flat position via a fold-down maneuver like the seat 28 of FIGS. 1-9. The seat 210 can comprise a seatback component 212 configured to fold forward to lie atop a seat pan component 214. While the suite 207 can still provide aprons to border the central seating area 159, aprons can be adapted to cooperate with the seat 210 to provide a contiguous surface. For example, a first apron can be adapted to provide head support for a fully reclined passenger, while a second apron can be adapted to provide leg support for a reclined passenger. In an example embodiment, a first apron 216 can be disposed at the first endwall 172, and a second apron 220 can be disposed at the opposing endwall 176. The first apron 216 can comprise a first side section 223 disposed above the legwell 138, a second side section 224 that can be disposed above the legwell 140, and can further include a rear section 226 disposed between the endwall 172 and the seat 210. The first and second side sections 223,224 can provide arm support for a seated passenger and sleeping space for a reclined passenger, while the rear section 226 provides head and neck support for a sleeping passenger.

Figure 16:
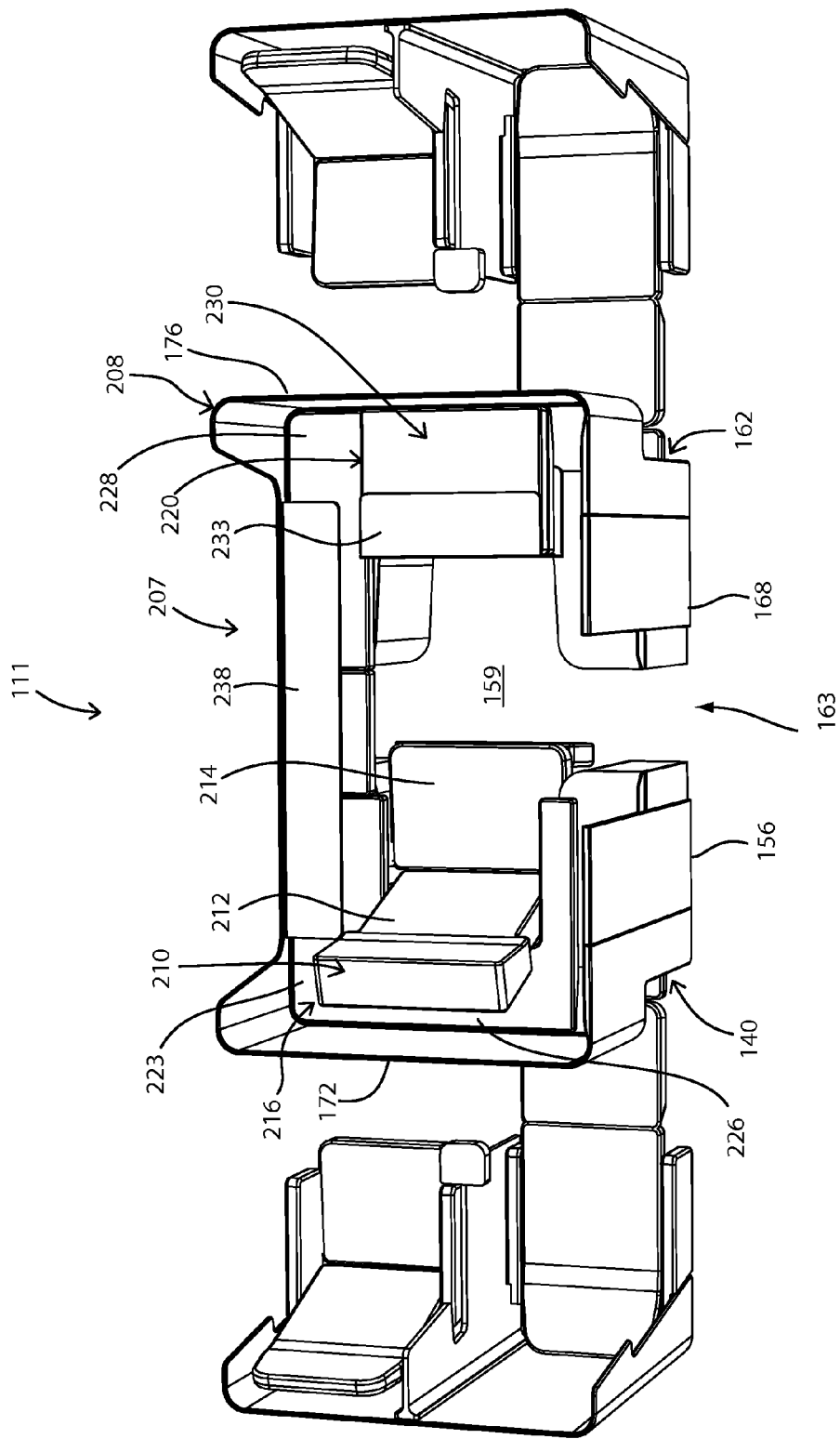
FIG. 16 depicts an example 5-seat grouping seating arrangement.

The second apron 220 can be disposed at the endwall 176 and can overlap one or both of the legwells 160, 162. The apron 220 can include a first side section 228 disposed over legwell 160, and can further include a footrest support 230. To provide lower leg support for a reclining passenger, the footrest support 230 can include a movable leg-support member 234 pivotably coupled to a fixed member 232 by a linkage 233. In a stowed position, the leg-support member 234 can lie atop the fixed member 232 as shown in FIG. 16. However, when the seat 210 is converted to a lie-flat position, the leg-support member 234 can be folded out towards the seat 210 in an extended position proximate the seat 210 as shown in FIG. 16, in a generally contiguous arrangement.

An infill component 236 can be disposed between the aprons 216,220 to close any gap therebetween. In an example embodiment, the infill component 236 can cover space 237 between the legwell 138 and the legwell 160 that can be used for stowage by a center occupant.

Figure 17:
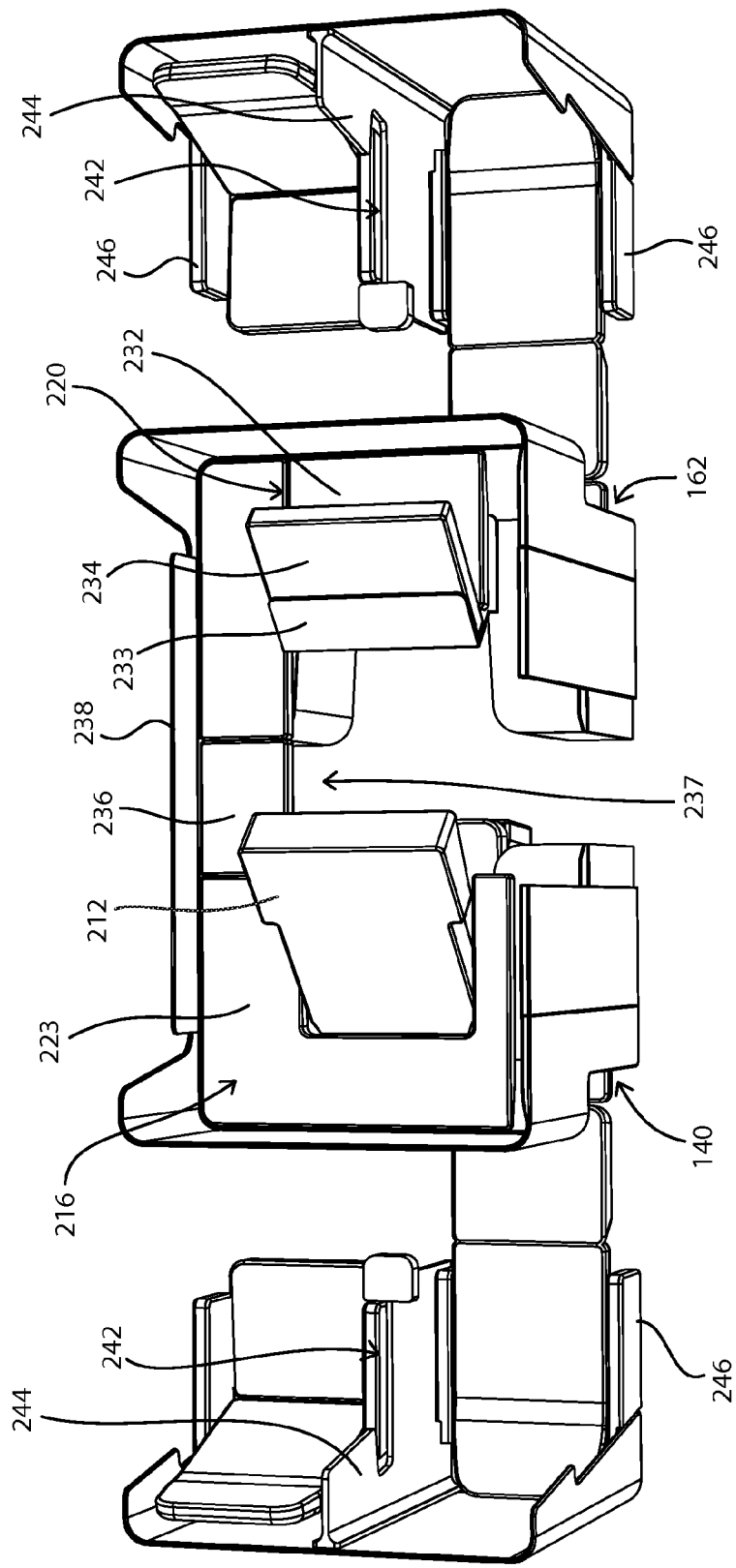
FIG. 17 depicts an example 5-seat grouping seating arrangement.
Figure 18:
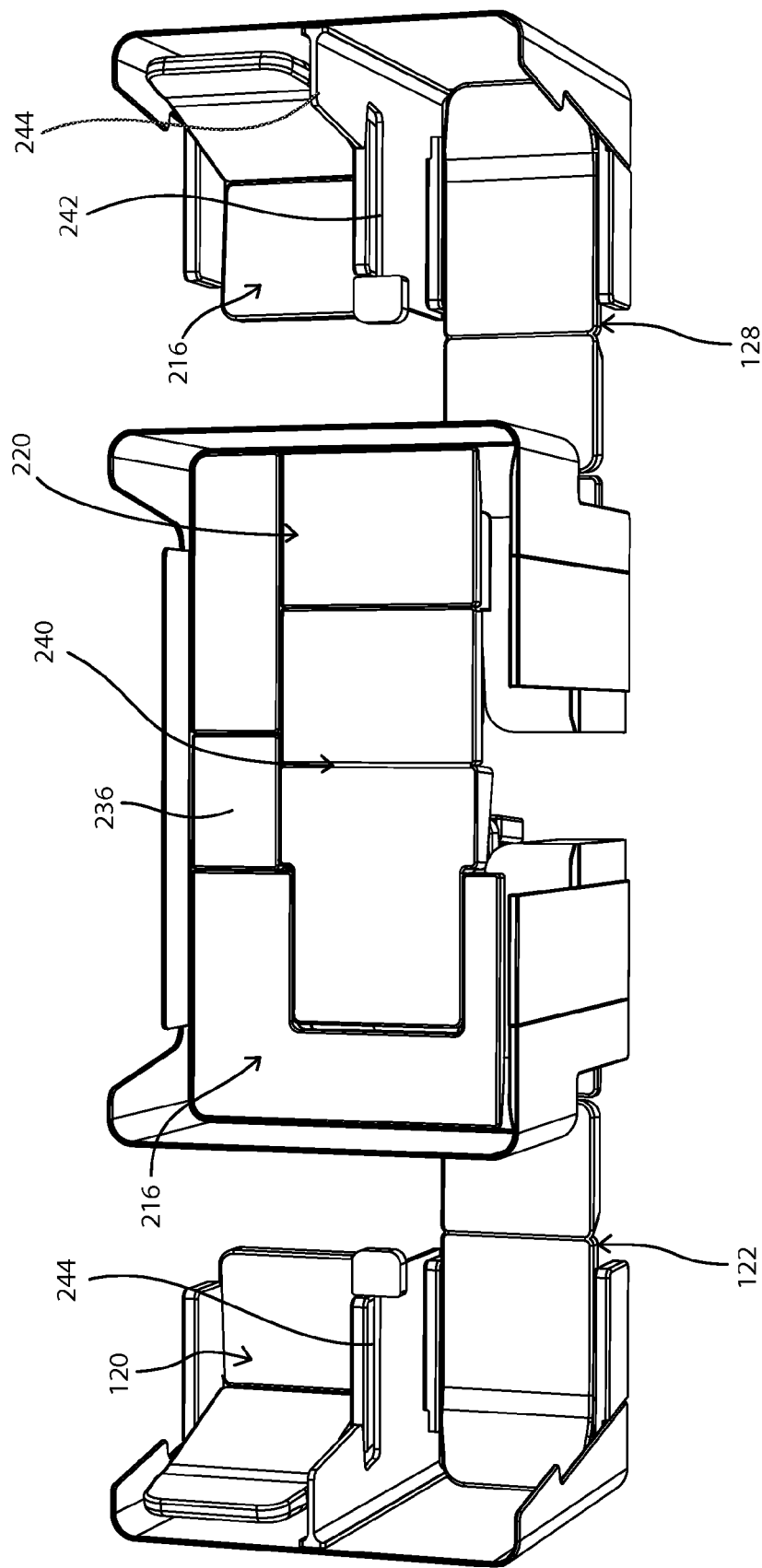
FIG. 18 depicts an example 5-seat grouping seating arrangement.
Figure 19:
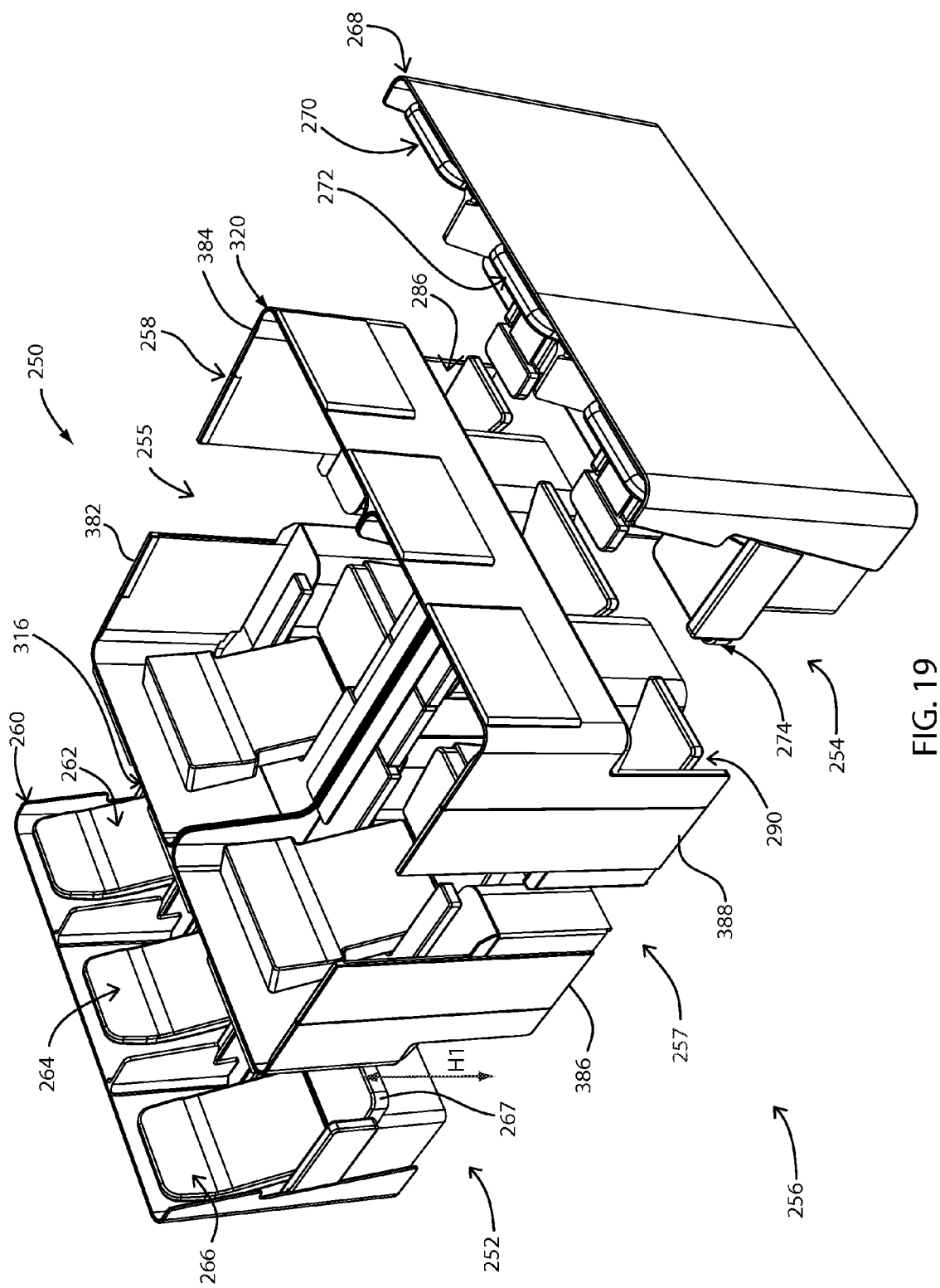
FIG. 19 depicts an example 8 seat grouping seating arrangement.

The shell structure 208 can further provide a side table 238 movable between an upright position and a horizontal position. In a horizontal position, the side table 238 can be configured to lie atop the aprons 216, 220 and the infill component 234. The side table 238 can provide a smooth, firm support surface conducive for eating, writing, supporting electronic devices, etc., and can be configured to move from a deployed horizontal position to an upright position as shown in FIGS. 16-18. For example, the side table 238 can be pivotably coupled to the compartment shell 208 by hinges (not shown), and can raised or lowered by an occupant. The side table 238 can be configured to remain in a stable upright position, and can provide lateral support and security to objects placed on either of the aprons 216,220 or the infill component 234.

The aprons 216,220 can cooperate with the seat 210 to form a bed for a center passenger. For example, the seat back 212 can be folded forward to rest on the seat pan 214, the side table 238 can be moved to an upright position, and the leg-support member 234 of the footrest support 230 can be extended. The first apron 216, the second apron 220, the infill component 236 and the seat 210 can cooperate to form a wide, generally contiguous, generally planar bed 240 for supporting a center passenger. As stated above, the components that form the bed 240 can include an upholstered, padded, cushioned, or an otherwise adapted surface that enhances passenger comfort for a passenger reclined in a sleeping position.

In an example embodiment, the standard beds 200, 202, 204,206 and the center bed 240 are generally parallel with each, other rather than angled with respect to each other, and can be arranged generally parallel with a longitudinal dimension of a vehicle cabin.

By way of example, the shell structure 118 can comprise an armrest partition member 242 disposed between the two seats 120 and 122. In an exemplary embodiment a privacy panel 244 can be disposed to provide separation and privacy between adjacent passengers. The shell structure 118 can further comprise an armrest component 246 for the seats 120,122. Likewise, the shell structure 124 can comprise an armrest partition member 242 disposed between the two seats 126,128. In an exemplary embodiment the privacy panel 244 can be disposed to provide separation and privacy between passengers in the aft-facing seats 126,128. The shell 125 can further provide armrest components 246 for the seats 126, 128.

FIGS. 19-27 show a further embodiment of a seating arrangement in which premium seating is combined with lower fare standard seating. The seating arrangement 250 comprises a standard fore-facing seating assembly 252, a standard aft-facing seating assembly 254, and a premium center seating assembly 256. Unlike the individual compartments provided by the previous arrangements, in this arrangement, the center assembly 256 is embodied as a double compartment suite that can provide a first compartment 255 for a first passenger, and a second compartment 257 for a second passenger. The center assembly 256 can comprise a shell 258 that can be variably configured to provide the two compartments 255, 257 as some adjacent common elements can be shared. For example, the shell 258 can be configured to provide a single endwall shared by the compartments 255, 257, or can have juxtaposed separated endwalls for each compartment. For illustrative purposes, and clarity while pointing out particular features, the discussion below will refer to a common shared endwall. A wide center suite shell 258 can increase seating capacity not only for the suite 256 itself, but for the seating assemblies with which it is associated.

By way of example, the center suite shell 258 can provide sufficient leg/foot space for triple seating in the standard seating assemblies 252,254 with which it is grouped, rather than the double occupancy standard seating of previously discussed arrangement 110. By way of example, the center assembly 256 can have a width around 89 inches, and the standard assembly 252 can have a width around 86 inches to accommodate the tapering end of the fuselage if needed. In a typical non-tapering application no difference between the width of 256 and 252 would be required.

In a triple-seating configuration, the fore-facing seating assembly 252 can comprise a shell 260, a first fore-facing seat 262, a middle fore-facing seat 264, and a third fore-facing seat 266. In a similar manner, the aft-facing seating assembly 254 can be configured for triple seating comprising a shell 268, a first aft-facing seat 270, a middle aft-facing seat 272, and a third aft-facing seat 274. In an example embodiment, all the seating assemblies 252, 254, 256 comprise seating convertible from an upright to a lie-flat position.

In the same manner as discussed previously herein, the standard seats 262-266, 270-274 can cooperate with footrests disposed at legwells provided by the center shell 258 to provide beds for passengers in standard seating. For example, the center suite shell 258 can provide an outer legwell 276 with a footrest 31, a middle legwell 278 with a footrest 282, and an outer legwell 280 with a footrest 33 for association with the fore-facing seats 262, 264, 268 seats respectively. The center suite shell 258 can further provide leg/foot space for aft-facing passengers, providing an outer legwell 286 with a footrest 33, a middle legwell 288 with a footrest 282, and an outer legwell 290 with a footrest 31 for association with the seats 270, 272, 274 respectively.

As in the previous arrangements, legwells can be configured to mirror each other across lines of symmetry. For example, opposing legwells associated with opposing fore- and aft-facing seats can be configured to mirror each other, such as, but not limited to, the legwells 276 and 286. Similarly, outer fore-facing legwells 276, 280 can mirror each other, and outer aft-facing legwells 286 and 290 can mirror each other. In the arrangement 250, the middle legwells 278, 288 have tapered sides that mirror the tapered sides of the outer legwells to either side of them. This mirrored arrangement directs the feet of the outer seat passengers toward sidewalls of the suite 256 and center passenger feet to the center of the suite 256, towards a notional center suite longitudinal axis extending between the two center seats.

As discussed earlier herein, to provide additional space for compartment seating, legwells can be configured to straddle a seat of a center seating assembly. When configured with double seating in a center compartment, and triple standard seating, middle legwells provided for middle standard seats can be disposed between the two center seats of the suite 256. In an example arrangement, the middle legwells 278, 288 can be larger than the outer legwells 276, 280,286 and 290. Like the legwells of previously discussed embodiments, the legwells of the arrangement 250 can be shaped to provide a wider space for receiving legs at a legwell opening, and a narrower space at an opposing end. While still angled and tapered along their linear dimension, the middle legwells 278, 288 can be wider throughout their lengths than the remaining legwells. In an example embodiment, a middle legwell can be wider at its mouth than the middle seat with which it is associated. As can be seen from the Drawings, tapered sides of the outer legwells can direct the feet of outer standard seating passengers to sidewalls of the suite 256 where they can be accommodated adjacent a center seat rather than under a center seat. By disposing a center seat between two legwells, rather than over a legwell, space above the legwells can be exploited to provide additional space and surface area for the center suite 256.

By way of example, the compartment shell 258 can include a first base support 292, and an opposing second base support 294 that can define the size and contours of the various legwells, as well as provide a first compartment sitting area 296 and a second compartment sitting area 298 for the center suite 256.

The shell base structures 292, 294 can each include a generally vertical basewall support member configured to define and contour outer and middle legwells and the sitting area 159; and a generally horizontal base topper member. A base topper member can be disposed atop a basewall support member and be configured to cover space between basewall support members and center suite shell 258 endwalls and sidewalls, thereby providing support and surface area for the suite 256. The basewall support member and the base topper member can be configured as a unitary piece, or as a combination of separate segments.

Figure 24:
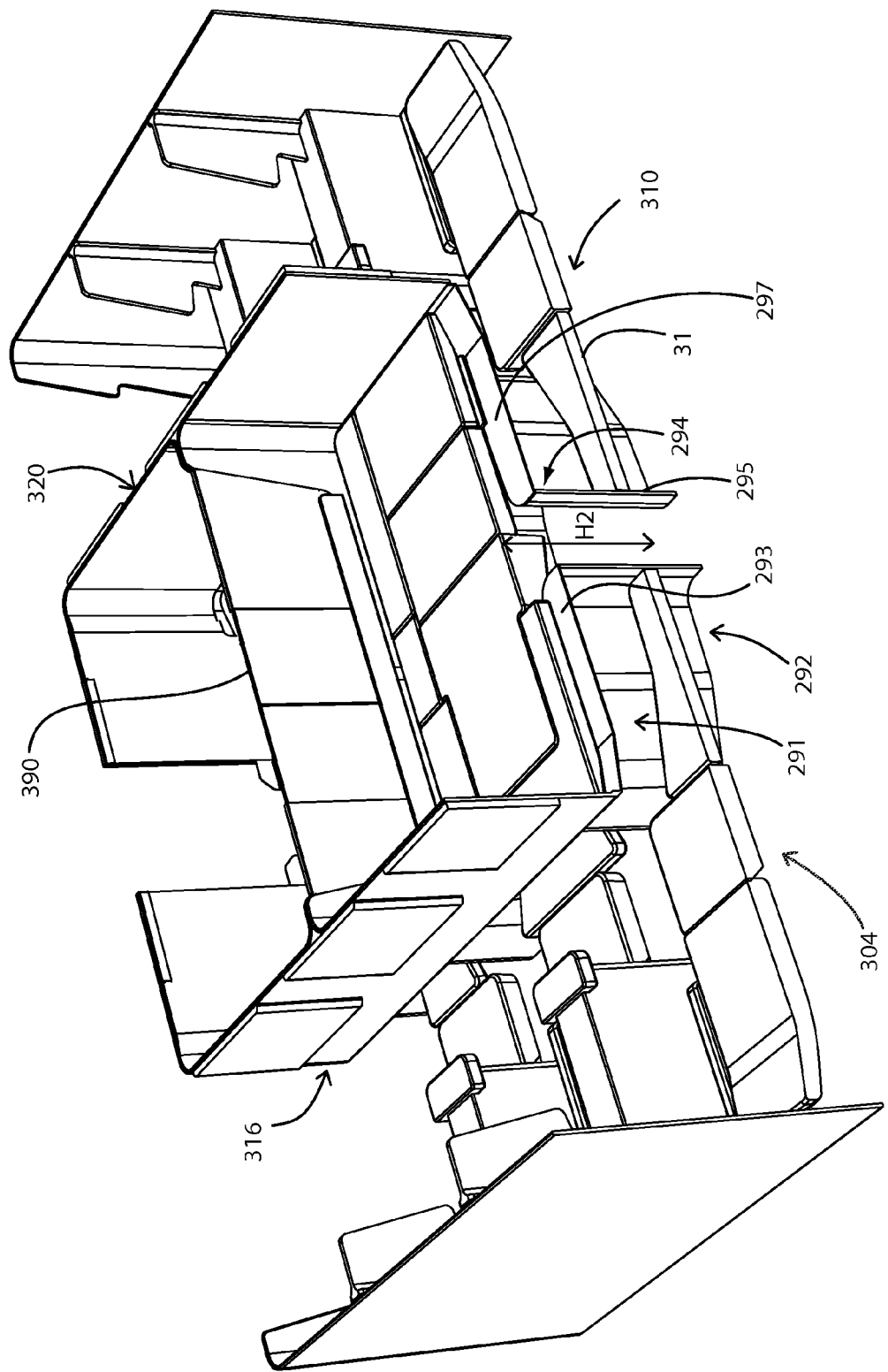
FIG. 24 depicts an example 8-seat grouping seating arrangement.
Figure 25:
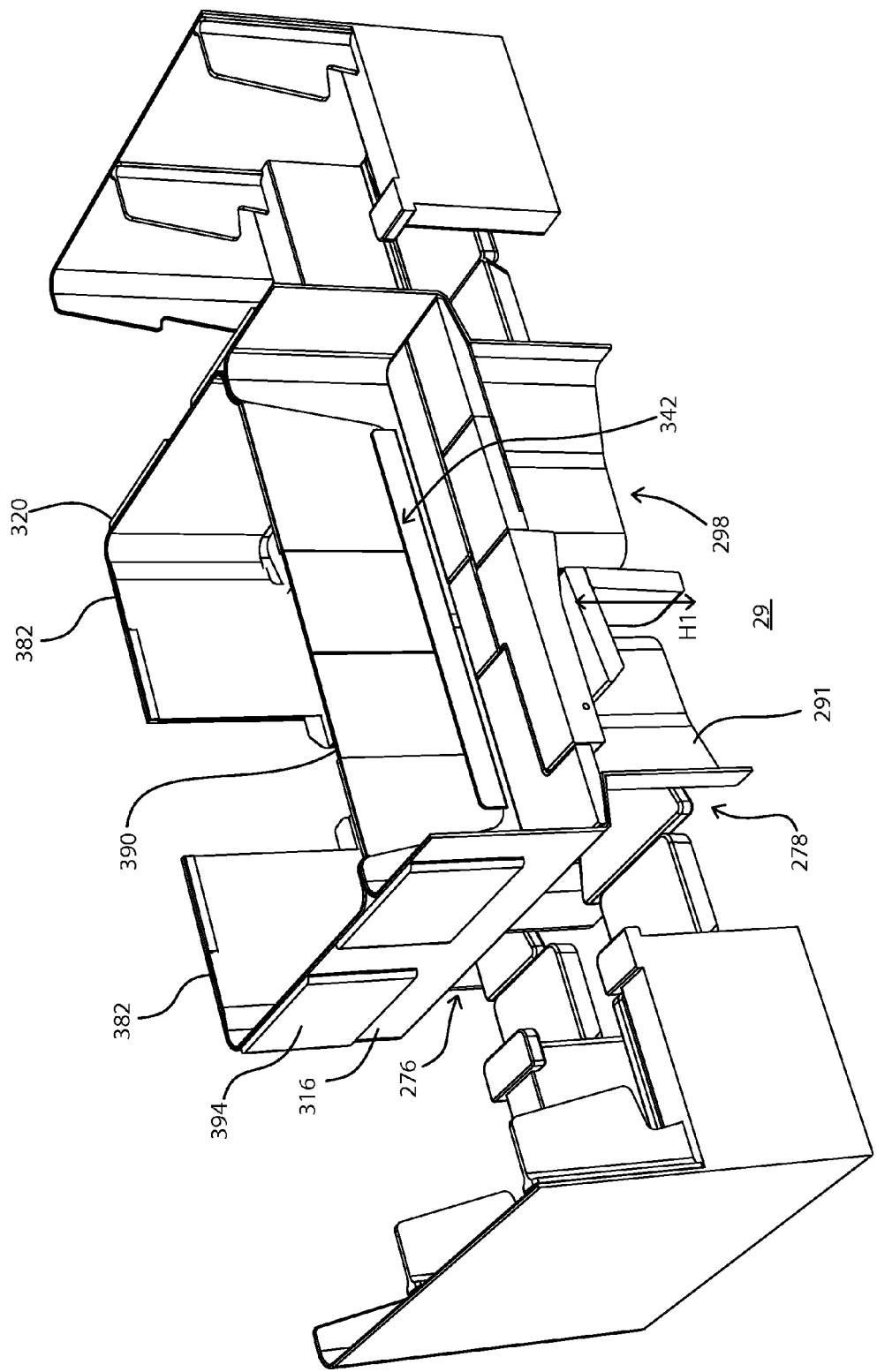
FIG. 25 depicts an example 8-seat grouping seating arrangement.
Figure 26:
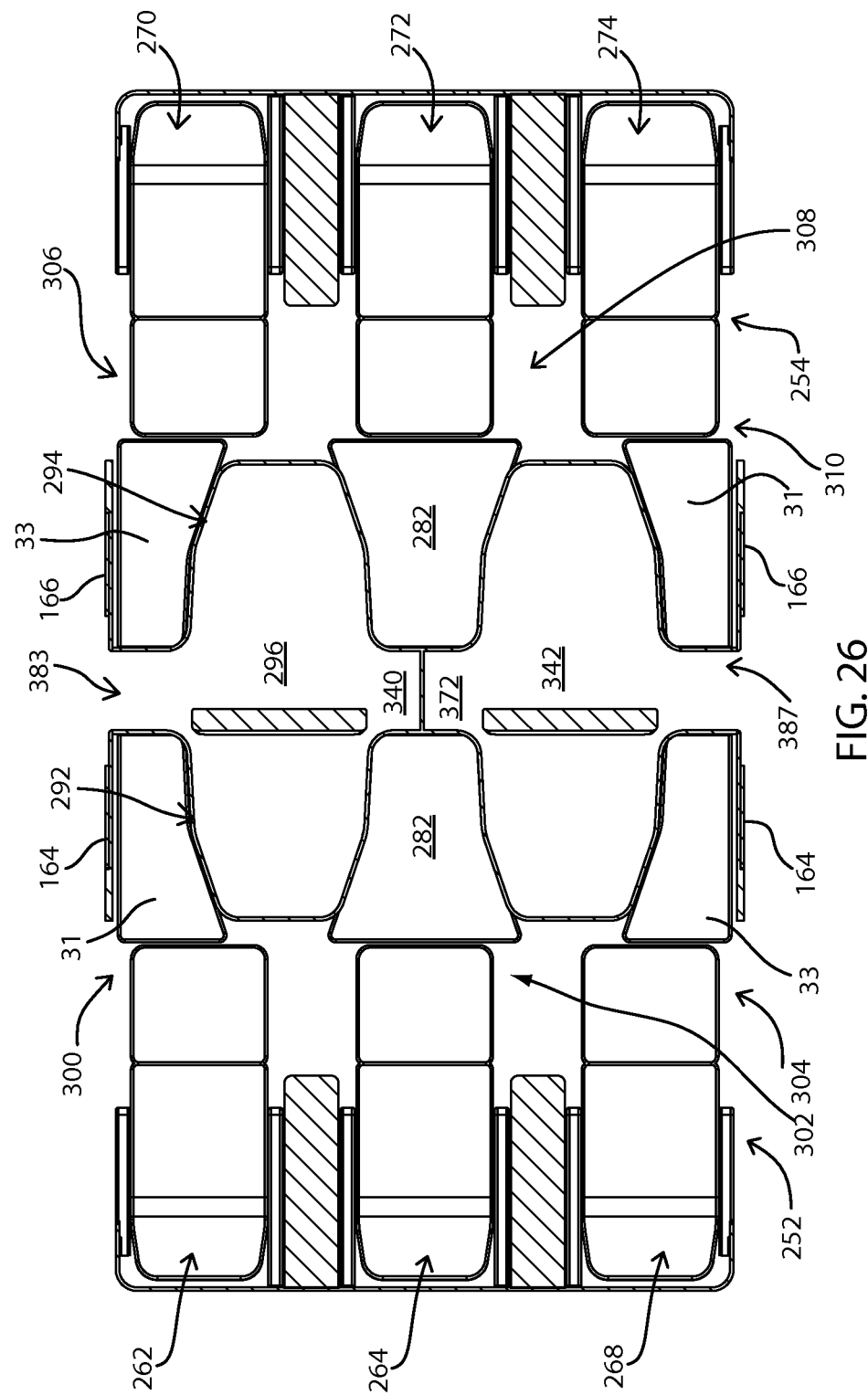
FIG. 26 depicts an example 8-seat grouping seating arrangement.

The shell base structure 292 can include a basewall support member 291 that can be best seen in the cut-away views of FIGS. 24-26; and a base topper 293. As shown in the Drawings, in an example embodiment, the base topper 293 can be disposed atop the basewall support member 291 to cover space between the basewall support 291 and a first endwall 316, between the basewall support 291 and a sidewall 382, and between the basewall support 291 and a sidewall 386. For example, in FIG. 27, the base topper 293 can be seen disposed above the legwell 280.

Likewise, the shell base structure 294 can include a basewall support member 295, and a base topper member 297. The base topper member 297 can be disposed atop the basewall support 295 to cover space between the basewall support member 295 and an opposing endwall 320, between the basewall support 295 and a sidewall 384, and between the basewall support member 295 and a sidewall 388. For example, in FIG. 27, the base topper 297 can be seen disposed over the legwell 290. The base toppers 293, 297 can be configured to cover all the legwells 276-280, 286-290 providing generous vertical space for standard seat passengers and valuable surface area for the suite 256.

FIG. 22-27 shows seats in the standard assemblies 252, 254 arranged in a lie-flat position in which associated legwells and footrests can provide standard beds for reclining passengers. For example, the footrest 31 of outer legwell 276 can cooperate with the fore-facing seat 262 to provide a bed 300, footrest 282 of the middle legwell 278 can cooperate with the middle seat 264 to provide a bed 302 for a middle passenger, and the footrest 33 of the legwell 280 can cooperate with the seat 266 to provide a bed 304. Due to the larger legwell 278 and footrest 282, the middle bed 302 can be larger than the adjacent beds 300, 304. Similarly, the footrest 33 of the outer legwell 286 can cooperate with the seat 270 to form a bed 306, the footrest 282 at the middle legwell 288 can cooperate with the seat 272 to provide a bed 308, and the footrest 31 at the outer legwell 290 can cooperate with the seat 274 to provide a bed 310.

Designed to provide business-class or premium seating, the center suite shell structure 258 can provide separation, privacy, and generous personal space for two passengers. The base toppers 293, 297 provide additional surface area and living space, while aprons can be provided at each compartment 255, 257 to cooperate with a center seat to provide a premium bed disposed at an elevated height.

In an example embodiment, the suite 256 can comprise a first seat 312 at the compartment 255, and a second seat 313 at the suite 256, each of which can be configured to convert from an upright to a lie-flat position to provide a raised bed. Center seats disposed at the suite 256 can be variously embodied to provide an upright sitting position and a generally horizontal lie-flat position. In an example embodiment, a center seat can be configured to fold forward when moved to a lie-flat position, such as the center seat 210 described above, in which a seat back can be moved to rest on a seat pan. By way of further example, a center suite seat can be configured for vertical translation such as the seat 136 previously described herein, in which a seat pan moves upward while a seat back moves backward. Additional seat embodiments for providing a raised bed will occur to those skilled in the art.

The suite 256 can include aprons disposed above the base support structures 292, 294 in each compartment 255, 257. Aprons can provide additional surface area that can be used in combination with the seats 312, 313 to provide a wide bed for each suite 256 passenger, as well to provide living or work space while a passenger is seated. As discussed previously herein, in an example embodiment, aprons can be disposed to lay on the base toppers 293 and 297, however, it is contemplated that aprons may be disposed directly atop basewall members 291, 295. Infill components can be disposed to cover any gap between aprons, so that a generally contiguous sleep surface can be provided.

Referring first to the compartment 255, a first apron 314 can be disposed at the endwall 316, and a second apron 318 can be disposed at the opposing endwall 320 to border the seat 312. The first apron 314 can comprise a first side section 322 disposed above the middle legwell 278 between the seat 312 and a compartment partition 390; a second side section 324 disposed between the outer legwell 276 and the seat 312, and a rear section 326 disposed between the endwall 316 and the seat 312. The first and second side sections 322,324 can provide arm support for a seated passenger; and the first side section 324 can provide additional sleep surface for a reclined passenger.

Figure 20:
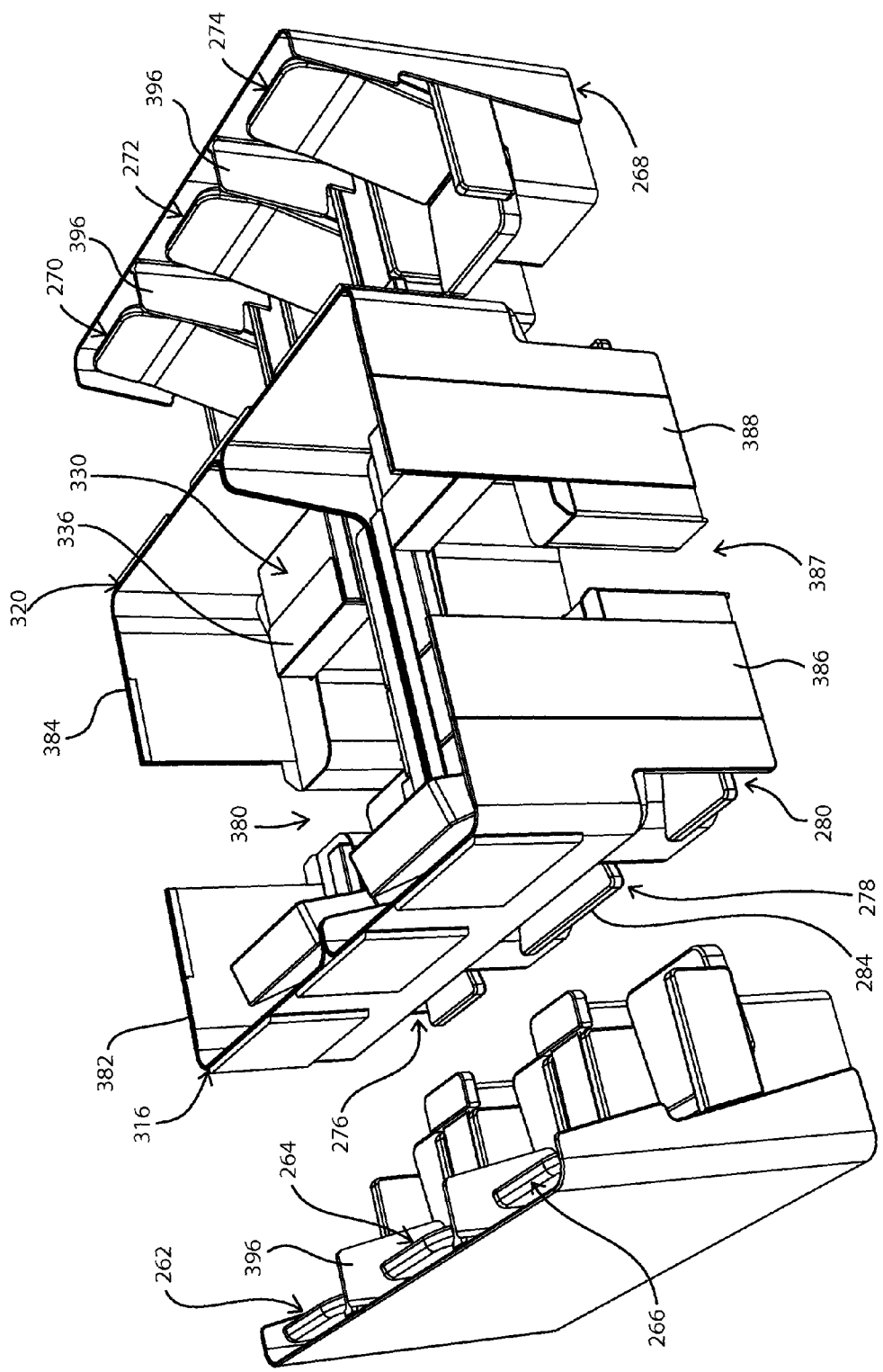
FIG. 20 depicts an example 8-seat grouping seating arrangement.
Figure 21:
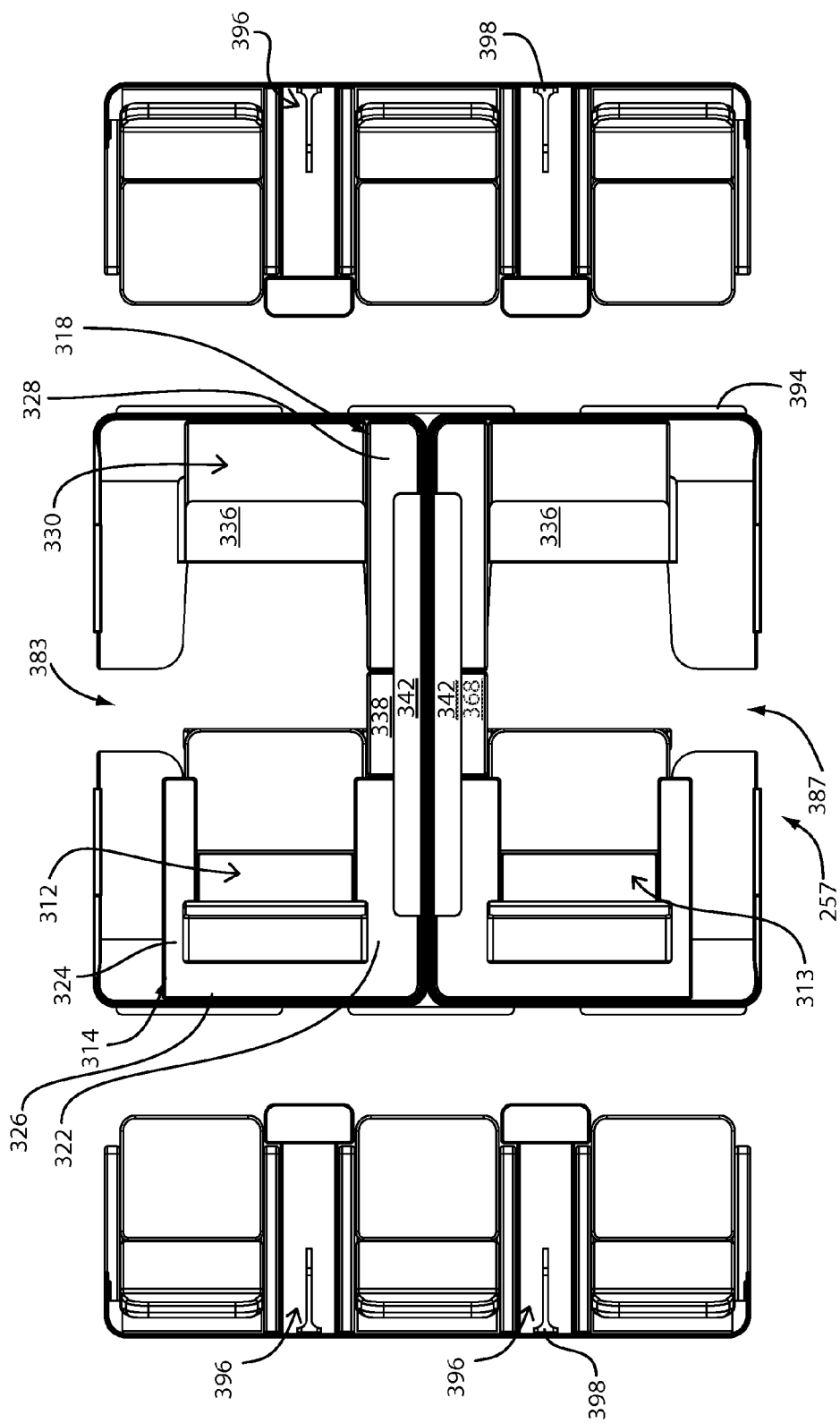
FIG. 21 depicts an example 8-seat grouping seating arrangement.
Figure 22:
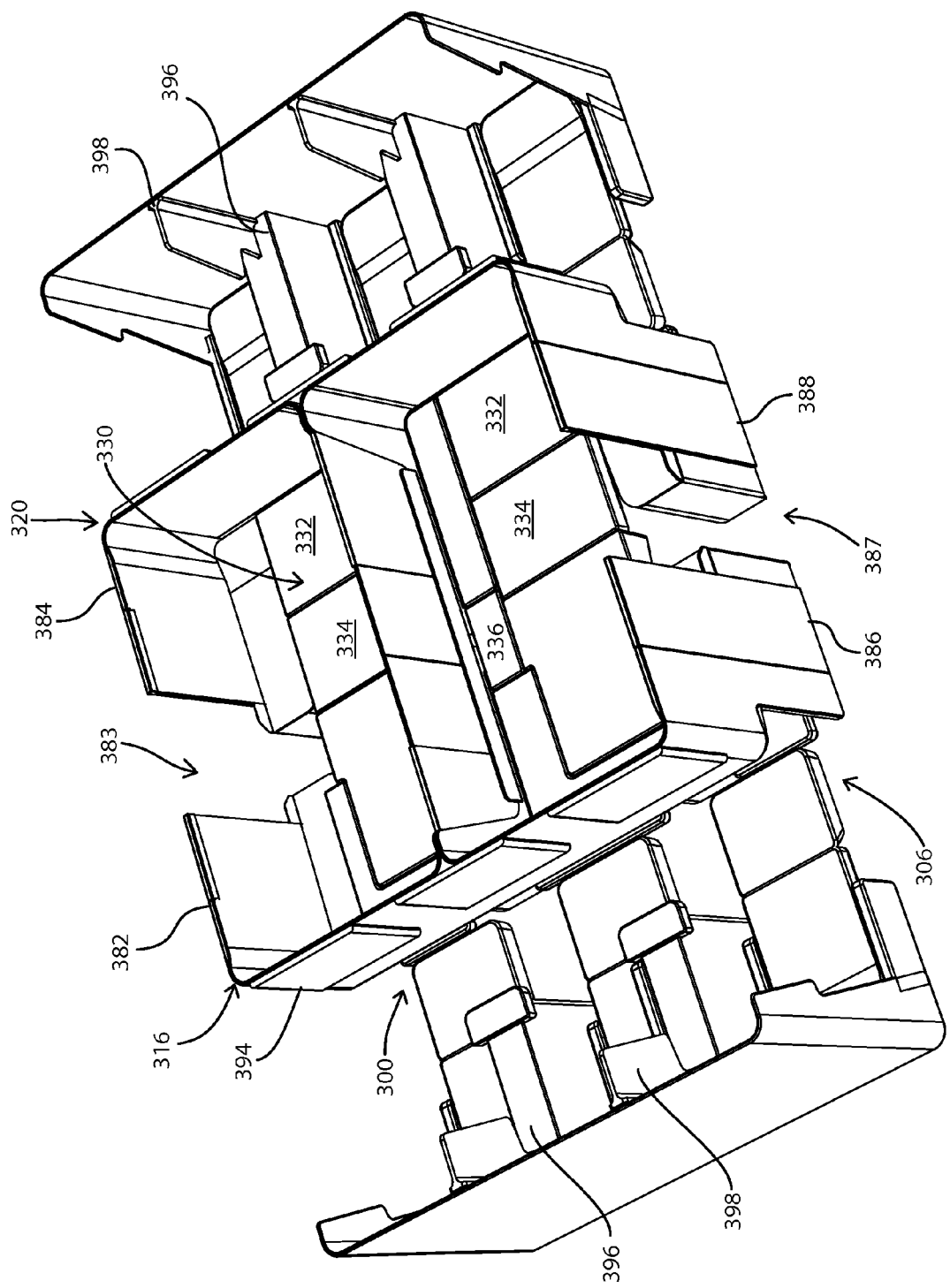
FIG. 22 depicts an example 8-seat grouping seating arrangement.
Figure 23:
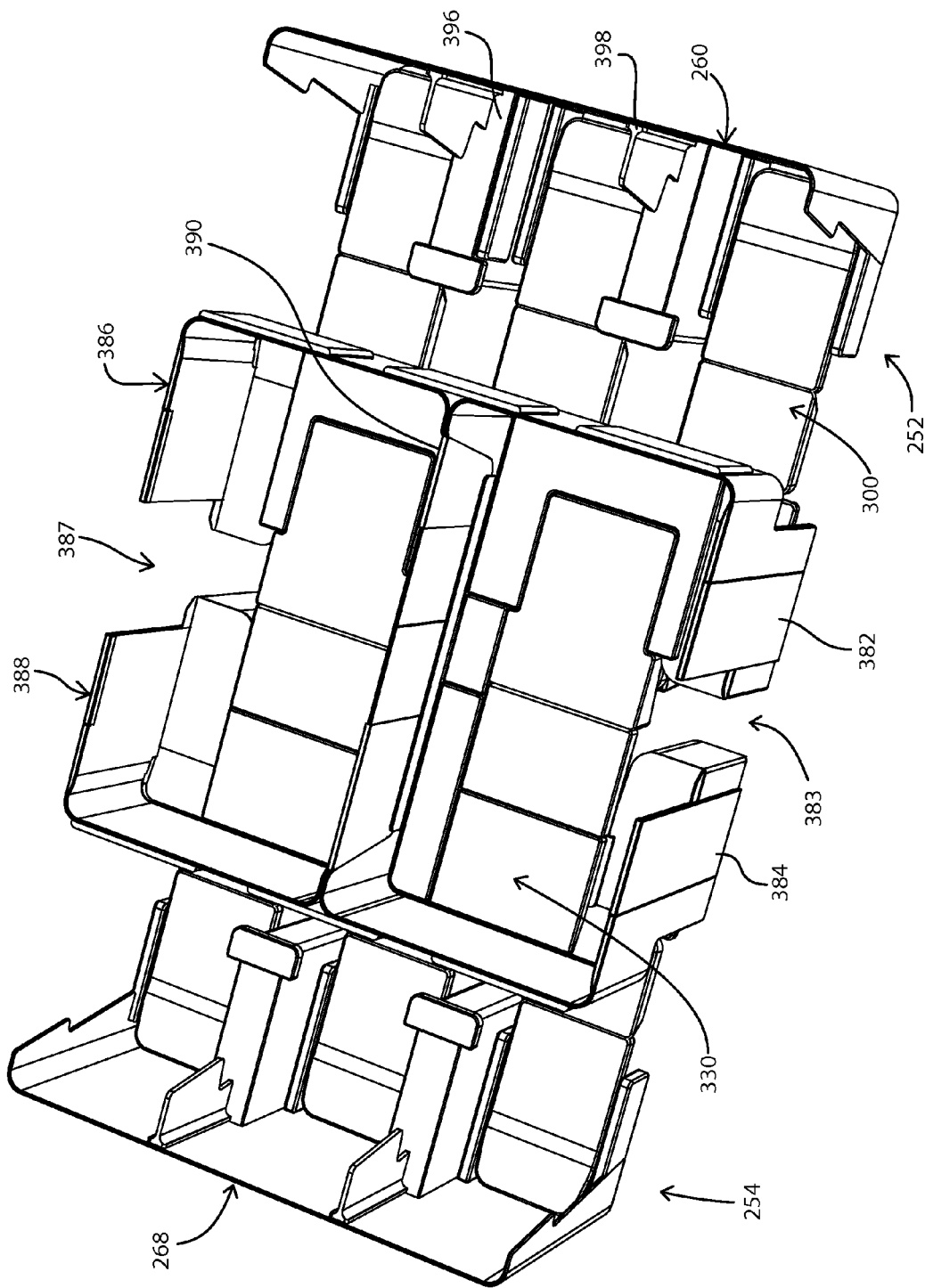
FIG. 23 depicts an example 8-seat grouping seating arrangement.
Figure 27:
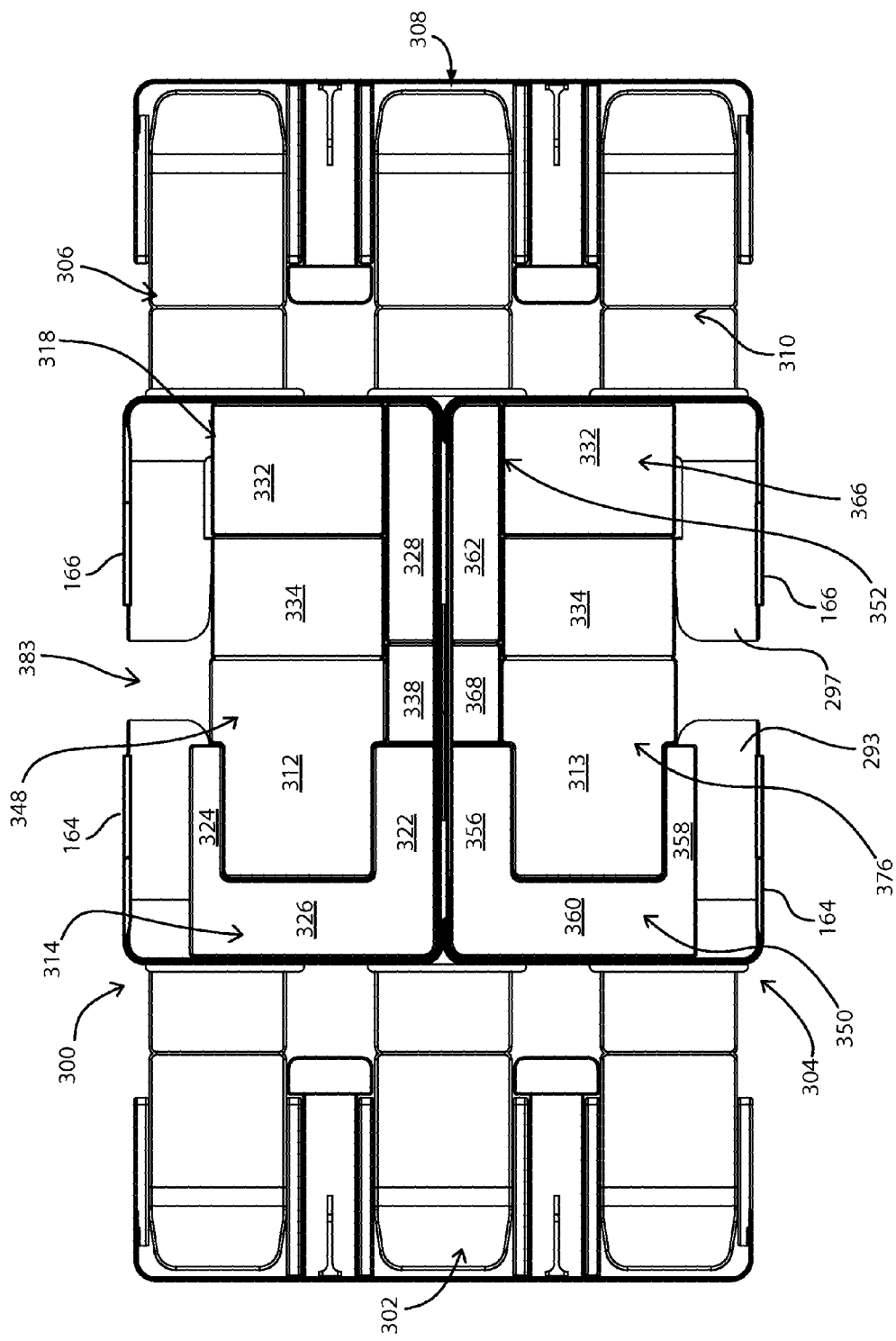
FIG. 27 depicts an example 8-seat grouping seating arrangement.

The second apron 318 can include a first side section 328 disposed above the middle legwell 288, and a footrest support 330 disposed between the legwells 286, 288 that can overlap one or both of them. The footrest support 330 can serve as a table or desk for a passenger of suite 256 and can include a fixed member 332, and a movable leg-support member 334 pivotably coupled to the fixed member 332 by a linkage 336. In a stowed position, the leg-support member 334 can lie atop the fixed member 332 as shown in FIG. 20. However, when the seat 312 is converted to a lie-flat position, the leg-support member 334 can be folded outward towards the seat 312 in an extended position to proximate the seat 312 and provide a generally contiguous sleep surface, as shown in FIGS. 22, 27.

The aprons 314,318 can provide surface area that can be used as a work surface, a dining surface, or as an area for supporting peripheral devices, electronics, etc for a seated center occupant. The open space above the aprons 314,318, as well as open space above base toppers 293, 297 exposed above legwells, creates additional private space for a compartment passenger. An infill component 338 can be disposed between the aprons 314,318 to close any gap therebetween to provide a generally contiguous surface. In an example embodiment, the infill component 338 can cover a space 340 between the legwell 278 and the legwell 288 that can be used for stowage by a center occupant.

The shell structure 258 can further provide a side table 342 movable between an upright position and a deployed horizontal position. In a deployed position, the side table 342 can be configured to lie atop the aprons 314,318 and the infill component 338. The side table 342 can provide a smooth, firm support surface conducive for eating, writing, supporting electronic devices, etc. The side table 342 can be configured to move from a horizontal position (FIG. 21) to an upright position as shown in FIG. 25. By way of example, the side table 342 can be pivotably coupled to the center suite shell 258, and can be raised or lowered by an occupant. The side table 342 can be configured to remain in a stable upright position when stowed, and can provide lateral support and security to objects placed on either of the aprons 314,318 or the infill component 328.

In an upright take-off position, the seat 312 can have a seat pan component 214 disposed at a first height H1 above the cabin floor 29, which can be generally the same as the height of a standard seat pan 267. However, when converted to a lie-flat orientation, the seat 312 can be configured to provide a bed at an increased height H2 above the cabin floor 29. The first apron 314, the second apron 318, the infill component 338, and the seat 312 can cooperate to form a wide, generally contiguous, generally planar bed 348 for supporting a center passenger. For example, a seat back component 344 can be folded forward to rest on a seat pan component 346, the side table 342 can be moved to an upright position, and the leg-support member 334 of the footrest 330 can be extended.

The aprons 314,318, disposed over the middle legwells 278,288, and the infill component 338, provide surface area that increases the overall width of the bed 348 so that it is wider than the seat 312. As stated above, the components that form the bed 348 can include an upholstered, padded, cushioned, or an otherwise adapted surface that enhances passenger comfort for a passenger reclined in a sleeping position.

The suite 256 can provide similar features for a compartment 257 passenger. Accordingly, a first apron 350 and a second apron 352 can be disposed to frame the second seating area 298. The first apron 350 can be disposed at the first endwall 316 and can have a first side section 356 disposed over the middle legwell 278, a second side section 358 and a rear section 360. The second apron 352 can be disposed at the opposing endwall 320 and can have a side section 362 disposed above the middle legwell 288 and a footrest support 366 disposed between the middle legwell 288 and the outer legwell 286, in a configuration that can overlap one or both of the legwells. The footrest support can comprise a fixed member 332 and a movable leg support member 334. An infill component 368 can be disposed between the first and second aprons 350,352 to cover any gap therebetween as well as any personal belongings stowed in the space 370 between the legwells 278,288. A side table 342 can be configured to move from an upright position to a horizontal position to rest on the aprons 350,352 and the infill component 368.

The first apron 350, the second apron 352, the infill component 368 and the seat 313 can cooperate to form a wide, contiguous, generally planar bed 376 for supporting a passenger of the center seat 313. The seatback component 344 can be folded down, the side table 342 can be raised to an upright position, and the leg-support member 334 can be extended. The aprons 350,352, disposed over the legwells middle legwells 378, 388, and the infill component 368, provide additional surface area that increases the overall width of the bed 376 so that it is wider than the seat 313. As stated above, the components that form the bed 376 can include an upholstered, padded, cushioned, or an otherwise adapted surface that enhances passenger comfort for a passenger reclined in a sleeping position.

A separate pass-through can be provided for each suite 256 occupant. In an example embodiment, a first pass-through 383 can be provided between sidewalls 382,384, the aprons 314,318, and the legwells 276,286 for the first compartment 255 and a second pass-through 387 can be provided between sidewalls 386,388, the aprons 350,352 and the legwells 280,290 for the compartment 257. Privacy doors 164, 166 can be disposed to close the pass-throughs 383 and 387 for additional privacy, particularly during those times that an occupant is sleeping. Separate ingress areas for passengers can provide increased separation and privacy between passengers sharing the suite 256.

With no need to share an ingress/egress, the partition 390 can be disposed to separate the compartments 255,257. By way of example, the partition 390 can extend between the opposing endwalls 316,320 across the middle legwells 276, 286 between the aprons 314 and 350, between the infill components 338 and 368, between the two side tables 342, and between the aprons 318 and 352. A partition frame 392 can be disposed atop the middle legwells 276,286 to support the partition 390. As shown in FIG. 20, the partition 390 can be configured to be removable so that passengers traveling together can easily converse and share space at the suite 256.

The endwalls 316,320 can provide additional features for the fore- and aft-facing passengers of the seating assemblies 252,254. For example, an individual entertainment center 394 can be provided for each standard seating passenger. Additional passenger convenience features (not shown) such as storage pockets, will occur to those skilled in the art.

Standard seating structures can also be configured to provide privacy between adjacent passengers. The shell structure 260 of the standard fore-facing seating assembly 252 can provide a divider 396 between the outer seat 262 and middle seat 264 and between the middle seat 264 and the outer seat 266. A privacy panel 398 can be disposed atop each of the dividers 396. Likewise, the shell structure 268 of the aft-facing seating assembly 254 can provide a divider 396 with a privacy panel 398 between the outer seat 270 and the middle seat 272, and between the middle seat 272 and outer seat 274. While not shown explicitly in the figures, the divider 396 can house armrests, tray tables, media control consoles and/or other passenger convenience features. When seats of the seating assemblies 252, 254 are reclined to a lie-flat position, the divider 396 provides additional privacy for sleeping occupants.

Unlike many prior art arrangements, seats of the fore- and aft-facing seating assemblies 252,254 can be arranged to be generally parallel with respect to the seats 312,313 of the center suite 256, to provide a non-angled arrangement. In an example embodiment, the seating assemblies 252-256 can be arranged generally parallel with a linear dimension of a vehicle cabin. Carefully considered disposition of leg space allows arrangements of the present invention to conserve space without arranging seats at an angle with respect to a cabin aisle.

Figure 28:
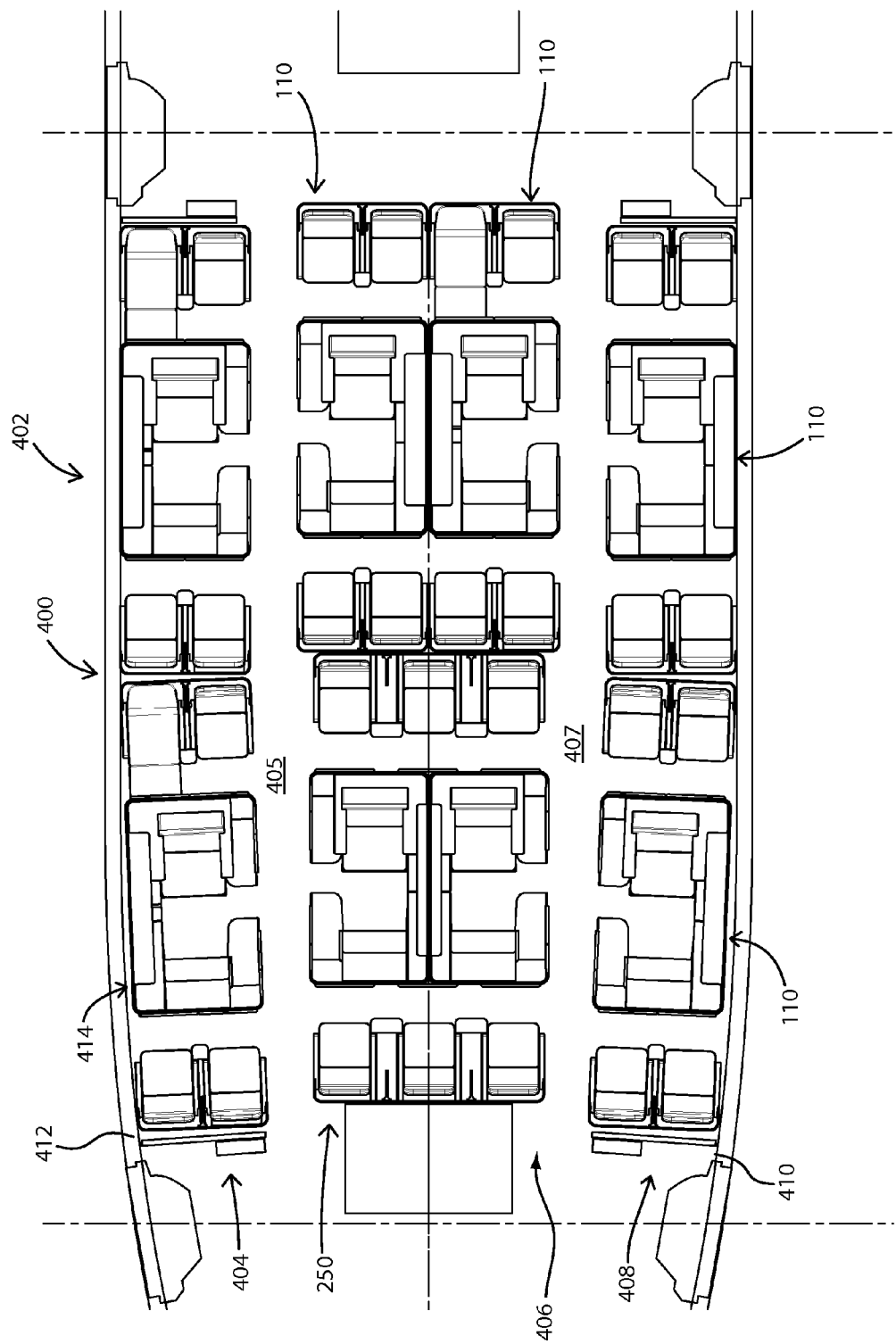
FIG. 28 shows a seating arrangement for an aircraft fuselage.

As the illustrative examples provided herein demonstrate, novel arrangements can mix premium lie-flat seating with standard lie-flat seating to provide various comfortable high-density seating options for a vehicle cabin. FIG. 28 shows an example arrangement 400 for an aircraft fuselage 402 in which a plurality of 5-seat groups comprising a center suite and 4 standard seats, can be combined with one or more 8-seat groups, comprising a double compartment suite and triple standard seating, can be arranged back-to-back down a linear dimension of the aircraft. The arrangement 400 can include a first outer seating column 404, a middle seating column 406, and a second outer seating column 408 separated by aisles 405 and 407. The side seating column 408 includes a plurality of the 5-seat groups 110 arranged back to back along a fuselage cabin wall 410. The side seating column 404, disposed along a cabin wall 412 includes a plurality of 5-seat groups 414, which are arranged to mirror the configuration of the 5-seat group 110 so that all suite occupants have aisle access.

Figure 29:
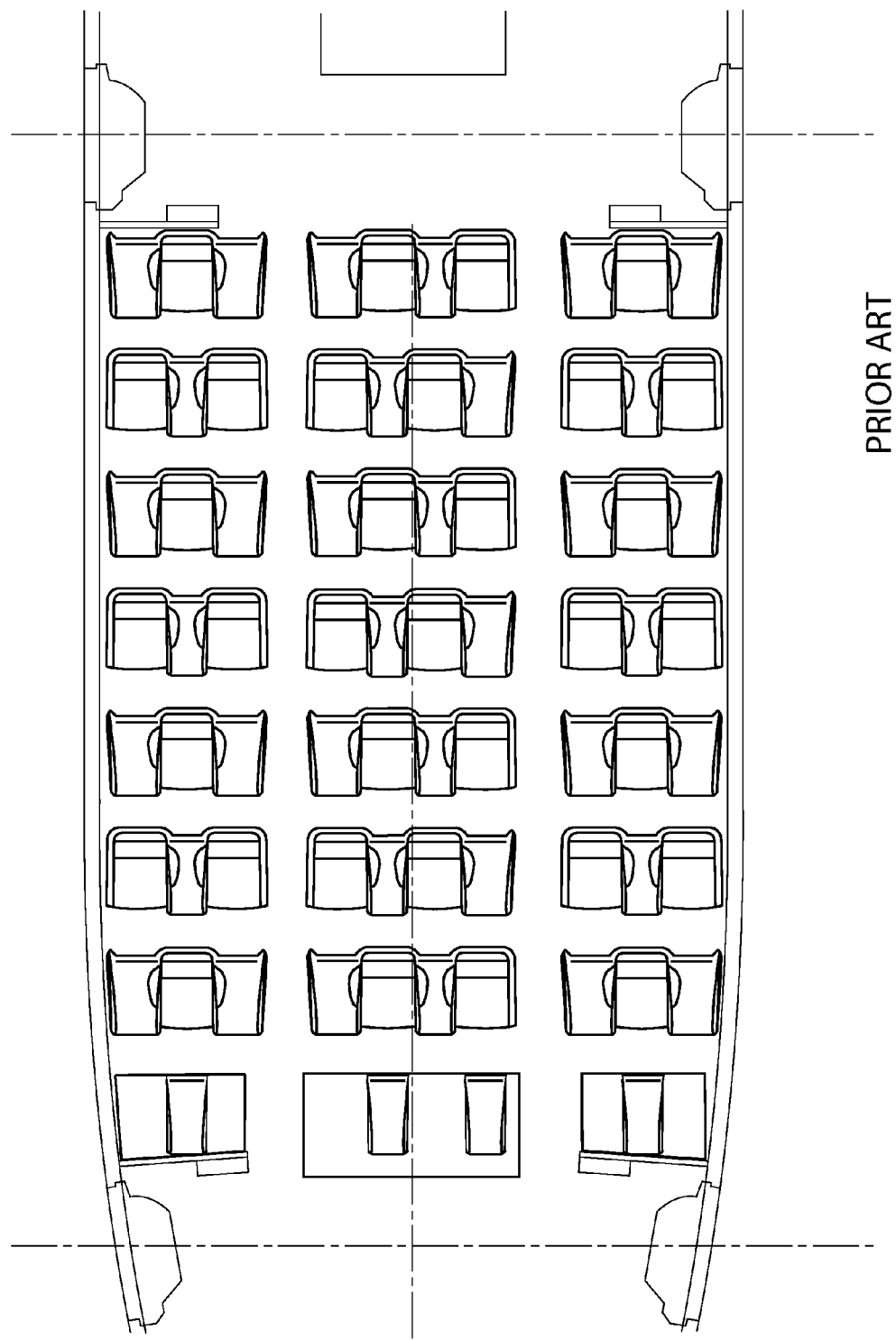
FIG. 29 depicts a prior art arrangement.
Figure 30:
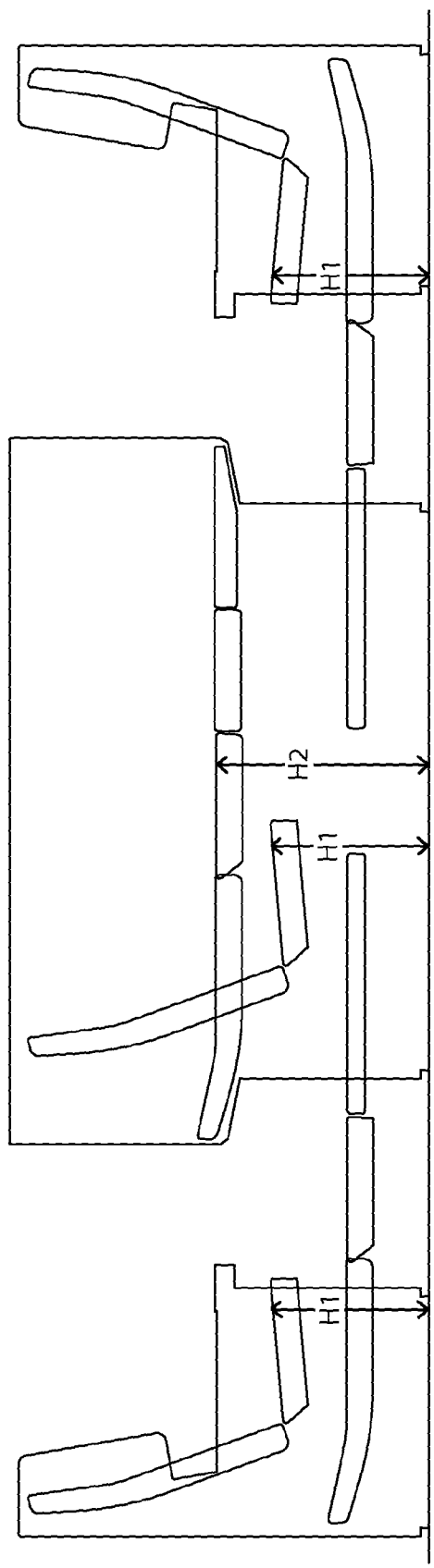
FIG. 30 depicts an example relationship among seat dimensions that can be used in a seating arrangement.

The middle seating column 406 provides a plethora of seating options as it mixes various levels of premium and standard seating. For example, the column 406 includes the 5-seat groups 110 and 414 that offer individual suite seating and dual-occupancy standard seating, and also includes the 8-seat group 250 that offers double compartment seating and triple standard seating. The various groups can be arranged back to back along the aircraft's linear dimension. When compared to prior art arrangements, such as those taught by U.S. Patent Application Publication US 2011/0169306 A1 to Thompson, published Jul. 14, 2011, and shown in FIG. 29, the arrangement 400 can provide 4 additional seats while providing 8 suites and wider standard seats. FIG. 30 shows some example seat widths and size relationships that can be employed in example embodiments.

As described herein, the invention can be practiced in various embodiments to provide both standard and premium lie-flat seats in a mixed arrangement that can efficiently and comfortably provide high-density seating. Fore-facing and aft-facing standard seating can be arranged about center premium level seating. A center suite structure can provide legwells for standard seat passengers that straddle a center seat in a non-underlapping configuration. Base toppers can be disposed around the perimeter of a center suite to cover the legwells, and provide additional surface area that can be used as living space. Aprons can be disposed above the base toppers to border a center seat. The aprons can cooperate with the center seat to provide a long, wide, generally contiguous, generally planar, generally horizontal bed when the center seat is moved from an upright to a lie-flat position. A center suite can comprise parallel endwalls that are generally orthogonal to parallel sidewalls to provide a center bed having generally uniform width and length. Legwells for standard seating passengers can be disposed in mirrored arrangements that efficiently provide generous space for center occupants while providing comfortable seating for standard seat occupants.

As required, illustrative embodiments have been disclosed herein, however the invention is not limited to the described embodiments. As will be appreciated by those skilled in the art, aspects of the invention can be variously embodied, combined, rearranged and configured. The invention encompasses all systems, apparatus and methods within the scope of the appended claims.

The invention claimed is:

1. A seating arrangement, comprising:
a fore-facing seating assembly comprising a fore-facing support shell and a fore-facing seat, said fore-facing seat having a seat pan disposed at a first height above a cabin floor when said fore-facing seat is in an upright position;
an aft-facing seating assembly comprising an aft-facing support shell and an aft-facing seat, said aft-facing seat having a seatpan disposed at said first height above said cabin floor when said aft-facing seat is in an upright position;
a center compartment disposed between said fore and aft-facing seating assemblies, said center compartment comprising a center shell and a center seat convertible from an upright to a lie-flat position;
wherein a seat pan of said center seat is disposed at said first height above a cabin floor when said center seat is in an upright position;
wherein a center bed provided by said center seat in cooperation with said center support shell is disposed at a second height above said cabin floor, said second height greater than said first height;
wherein said center compartment comprises a first legwell positioned proximate said center seat in a non-underlapping disposition and defined by a wall of said center compartment, wherein said first legwell accommodates a reclined occupant of said fore-facing seat;
wherein said center compartment comprises a second legwell that accommodates a reclined occupant of said aft-facing seat.

2. The arrangement of claim 1, wherein said center bed overlaps said first legwell.

3. The arrangement of claim 1, wherein said center bed overlaps said second legwell.

4. A seating arrangement, comprising:
a fore-facing seating assembly having a fore-facing support shell, a first fore-facing seat and a second fore-facing seat, said fore-facing seats having a seat pan disposed at a first height relative to a vehicle cabin floor;
a suite having a suite support structure and a suite seat convertible from an upright to a lie-flat position, said suite seat having a seat pan disposed at said first height above said vehicle cabin floor;
wherein said suite seat is configured to cooperate with said suite support structure to provide a suite bed at a second height relative to said vehicle cabin floor, said second height greater than said first height;
wherein said suite comprises a first legwell that accommodates a reclined occupant of said first fore-facing seat, and an second legwell that accommodates a reclined occupant of said second fore-facing seat; and
wherein said suite seat is disposed adjacent and between said first and second legwells in a non-overlapping disposition.

5. The arrangement of claim 4, wherein said first and second legwells are disposed in a parallel configuration.

6. The arrangement of claim 4, wherein said first legwell is provided at a first sidewall of said suite, and said second legwell is provided at an opposing sidewall of said suite, said first sidewall parallel to said second sidewall.

7. The arrangement of claim 4, wherein said suite bed overlaps said first legwell.

8. The arrangement of claim 4, wherein said suite comprises a third legwell that accommodates a reclined occupant of a first aft-facing seat, said third legwell disposed in an aligned opposing disposition relative to said first legwell.

9. The arrangement of claim 8, wherein said suite bed overlaps said third legwell.

10. The arrangement of claim 4, wherein said suite comprises a fourth legwell that accommodates a reclined occupant of a second aft-facing seat, said fourth legwell parallel to said third legwell.

11. The arrangement of claim 10, wherein said suite bed overlaps all said legwells.

12. The arrangement of claim 4, wherein said arrangement further comprises an aft-facing seating assembly comprising said first aft-facing seat and said second aft-facing seat, wherein said suite seating assembly is disposed between said fore- and aft-facing seating assemblies.

13. The seating arrangement of claim 4, wherein a first base topper is disposed over said first and second legwells to provide generally horizontal surface area.

14. The seating arrangement of claim 4, wherein a first apron disposed on top of said first base topper cooperates with said suite seat to provide said suite bed.

15. The seating arrangement of claim 4, wherein a second base topper is disposed over said third and fourth legwells to provide generally horizontal surface area.

16. The seating arrangement of claim 4, wherein a second apron disposed on top of said second base topper cooperates with said suite seat to provide said suite bed.

17. A seating arrangement, comprising:
a fore-facing seating assembly having a fore-facing support shell, a first fore-facing seat and a second fore-facing seat, said fore-facing seats having a seat pan disposed at a first height relative to a vehicle cabin floor;
a suite having a suite support structure and a first compartment seat convertible from an upright to a lie-flat position, said first compartment seat having a seat pan disposed at said first height above said vehicle cabin floor, and having a second compartment seat convertible from an upright to a lie-flat position, said second compartment seat having a seat pan disposed at said first height above said vehicle cabin floor;
wherein said first compartment seat is configured to cooperate with said suite support structure to provide a first compartment bed at a second height relative to said vehicle cabin floor, said second height greater than said first height;
wherein said suite comprises a first outer legwell that accommodates a reclined occupant of said first fore-facing seat, a middle legwell that accommodates a reclined occupant of said second fore-facing seat, and a second outer legwell that accommodates a reclined occupant of a third fore-facing seat; and
wherein said first compartment seat is disposed between said first outer legwell and said middle legwell in a non-overlapping disposition.

18. The seating arrangement of claim 17, wherein said second compartment seat is disposed between said middle legwell and said second outer legwell.

19. The seating arrangement of claim 17, wherein said second compartment seat is configured to cooperate with said suite support structure to provide a second compartment bed at said second height relative to said vehicle cabin floor.

20. The seating arrangement of claim 17, wherein said first and second outer legwells are parallel to one another.

21. The seating arrangement of claim 17, wherein said suite further comprises a third outer legwell that accommodates a reclined occupant of a first aft-facing seat, a second middle legwell that accommodates a reclined occupant of a second aft-facing seat, and a fourth outer legwell that accommodates a reclined occupant of a third aft-facing seat.

22. The seating arrangement of claim 17, further comprising an aft-facing seating assembly having an aft-facing support shell, a first aft-facing seat, and a second aft-facing seat, said aft-facing seats having a seat pan disposed at said first height relative to said vehicle cabin floor.

23. The seating arrangement of claim 17, wherein said first outer legwell is aligned in an opposing disposition with a third outer legwell at said suite that accommodates a reclined occupant of an aft-facing seat.

24. The seating arrangement of claim 21, wherein said middle legwells are disposed along a center line of said suite.

25. The seating arrangement of claim 21, wherein said third and fourth outer legwells are parallel.

26. The seating arrangement of claim 17, wherein said first compartment bed overlaps said middle legwell.

27. The seating arrangement of claim 19, wherein said second compartment bed overlaps said middle legwell.

28. The seating arrangement of claim 17, wherein a first apron disposed over a first base topper cooperates with said first compartment seat to provide said first compartment bed.

29. The seating arrangement of claim 17, wherein a second apron disposed on top of said first base topper cooperates with said second compartment seat to provide a second compartment bed.

\* \* \* \* \*